United States Patent
Abe et al.

(10) Patent No.: US 11,661,057 B2
(45) Date of Patent: May 30, 2023

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Chihiro Abe, Wako (JP); Katsuya Yashiro, Wako (JP); Hironobu Kiryu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 142 days.

(21) Appl. No.: 16/571,236

(22) Filed: Sep. 16, 2019

(65) Prior Publication Data

US 2020/0094826 A1 Mar. 26, 2020

(30) Foreign Application Priority Data

Sep. 26, 2018 (JP) .............................. JP2018-180896

(51) Int. Cl.
  *B60W 30/14* (2006.01)
  *B60W 30/16* (2020.01)
  *B60Q 1/50* (2006.01)

(52) U.S. Cl.
  CPC .......... *B60W 30/143* (2013.01); *B60Q 1/525* (2013.01); *B60W 30/16* (2013.01)

(58) Field of Classification Search
  CPC ...... B60W 30/143; B60W 30/16; B60Q 1/525
  See application file for complete search history.

(56) References Cited

U.S. PATENT DOCUMENTS

| 2016/0252905 A1 | 9/2016 | Tian et al. |
| 2016/0259334 A1 | 9/2016 | Hashimoto et al. |

(Continued)

FOREIGN PATENT DOCUMENTS

| JP | 2008-084004 | 4/2008 |
| JP | 2008-260337 | 10/2008 |

(Continued)

OTHER PUBLICATIONS

Japanese Decision of Rejection for Japanese Patent Application No. 2018-180896 dated Dec. 1, 2020.

(Continued)

*Primary Examiner* — Maceeh Anwari
*Assistant Examiner* — Charles Pall
(74) *Attorney, Agent, or Firm* — Amin, Turocy & Watson, LLP

(57) ABSTRACT

A vehicle control device includes a recognizer that is configured to recognize a surrounding situation of a host vehicle and a driving controller that is configured to control acceleration or deceleration and steering of the host vehicle on the basis of a recognition result of the recognizer. The driving controller is configured to cause the host vehicle to operate in at least any of a first driving state and a second driving state in which a rate of automation is higher or tasks required of an occupant are fewer than in the first driving state, and is configured to transition a driving state of the host vehicle to the first driving state on the basis of movement of a rearward vehicle that travels rearward of the host vehicle recognized by the recognizer in a direction of a vehicle width in a case where the host vehicle is operating in the second driving state.

16 Claims, 12 Drawing Sheets

(56) References Cited

U.S. PATENT DOCUMENTS

| | | | |
|---|---|---|---|
| 2016/0297447 A1* | 10/2016 | Suzuki | B60W 30/16 |
| 2017/0174210 A1 | 6/2017 | Choi et al. | |
| 2017/0327110 A1 | 11/2017 | Inoue et al. | |
| 2018/0170370 A1 | 6/2018 | Kataoka | |
| 2018/0334161 A1* | 11/2018 | Mizuno | B60W 10/04 |
| 2019/0317506 A1* | 10/2019 | Ishioka | B60W 10/20 |

FOREIGN PATENT DOCUMENTS

| | | | |
|---|---|---|---|
| JP | 2010-237792 | 10/2010 | |
| JP | 2010237792 A * | 10/2010 | |
| JP | 2014-043156 | 3/2014 | |
| JP | 2014043156 A * | 3/2014 | |
| JP | 2016-028927 | 3/2016 | |
| JP | 2016028927 A * | 3/2016 | B60R 21/00 |
| JP | 2017-030518 | 2/2017 | |
| JP | 2018-116409 | 7/2018 | |
| WO | 2016/080452 | 5/2016 | |
| WO | WO-2016080452 A1 * | 5/2016 | B60W 30/00 |

OTHER PUBLICATIONS

Japanese Office Action for Japanese Patent Application No. 2018-180896 dated Jul. 7, 2020.

Chinese Office Action for Chinese Patent Application No. 201910880065.2 dated Jul. 26, 2022.

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2018-180896, filed Sep. 26, 2018, the content of which is incorporated herein by reference.

BACKGROUND

Field of the Invention

The present invention relates to a vehicle control device, a vehicle control method, and a storage medium.

Description of Related Art

Since the past, a technique in which, in a case where an emergency vehicle is specified by analyzing an image captured by a camera included in a host vehicle, the host vehicle is decelerated and is moved to a road shoulder has been known (for example, Specification of U.S. Patent Application Publication No. 2016/0252905).

SUMMARY

However, in the related art, it was difficult to recognize an emergency vehicle before the emergency vehicle came within an area immediately behind a host vehicle. In this case, it took time to switch an autonomous driving state of the host vehicle in accordance with the approach of the emergency vehicle, and was not always possible to prepare for passage of the emergency vehicle rapidly.

The present invention was contrived in view of such circumstances, and one object thereof is to provide a vehicle control device, a vehicle control method, and a storage medium which make it possible to prepare for passage of an emergency vehicle more rapidly.

A vehicle control device, a vehicle control method, and a storage medium according to this invention have the following configurations adopted therein.

(1) According to an aspect of this invention, there is provided a vehicle control device including: a recognizer that is configured to recognize a surrounding situation of a host vehicle; and a driving controller that is configured to control acceleration or deceleration and steering of the host vehicle on the basis of a recognition result of the recognizer, wherein the driving controller is configured to cause the host vehicle to operate in at least any of a first driving state and a second driving state in which a rate of automation is higher or tasks required of an occupant are fewer than in the first driving state, and transition a driving state of the host vehicle to the first driving state on the basis of movement of a rearward vehicle that travels rearward of the host vehicle recognized by the recognizer in a direction of a vehicle width in a case where the host vehicle is operating in the second driving state.

(2) In the aspect of the above (1), the rearward vehicle includes a vehicle that travels rearward of the host vehicle in a host lane that is a lane in which the host vehicle travels or a lane that is adjacent to the host lane.

(3) In the aspect of the above (1), the recognizer is further configured to recognize the presence or absence of a lane that enables the rearward vehicle to enter a side on which the rearward vehicle is offset in the direction of a vehicle width, and in a case where the host vehicle is operating in the second driving state, the driving controller is configured to maintain the driving state of the host vehicle in the second driving state in a case where the movement of the rearward vehicle recognized by the recognizer in the direction of a vehicle width satisfies a reference and it is recognized that the entrance enabling lane is present, and transition the driving state of the host vehicle to the first driving state in a case where the movement of the rearward vehicle recognized by the recognizer in the direction of a vehicle width satisfies a reference and it is not recognized that the entrance enabling lane is present.

(4) In the aspects of the above (1), the driving controller is configured to determine that the movement of the rearward vehicle in the direction of a vehicle width satisfies a reference in a case where an amount of offset of the rearward vehicle recognized by the recognizer in the direction of a vehicle width satisfies a first reference, and a continuation aspect of satisfying the first reference satisfies a second reference.

(5) In the aspect of the above (4), the first reference includes that the amount of offset of the rearward vehicle in the direction of a vehicle width is equal to or greater than a first threshold.

(6) In the aspect of the above (4), the first reference includes that the amount of offset of the rearward vehicle in the direction of a vehicle width is equal to or greater than a first threshold and less than a second threshold.

(7) In the aspect of the above (6), the driving controller is configured to reduce an interval between the first threshold and the second threshold in a case where a lane that enables the rearward vehicle to enter a side on which the rearward vehicle is offset in the direction of a vehicle width is not recognized by the recognizer, and it is recognized that a road shoulder is not present on the side on which the rearward vehicle is offset in the direction of a vehicle width.

(8) In the aspects of the above (4), the continuation aspect satisfying the second reference includes that a state in which the rearward vehicle satisfies the first reference continues for a predetermined time or more.

(9) In the aspects of the above (4), the continuation aspect satisfying the second reference includes that a traveling distance that the rearward vehicle has traveled in a state in which the first reference is satisfied is equal to or greater than a predetermined distance.

(10) In the aspects of the above (3), the amount of offset is measured from a lane center or a center of the host vehicle.

(11) In the aspects of the above (1), the vehicle control device further includes: a notifier that is configured to notify of information; and a notification controller that is configured to cause the notifier to notify a driver of the host vehicle of a request for avoidance control for avoiding a rearward vehicle in a case where another rearward vehicle entering a relative position before the rearward vehicle moves in the direction of a vehicle width is recognized by the recognizer.

(12) In the aspects of the above (1), the driving controller is configured to return the driving state of the host vehicle to the second driving state in a case where a predetermined condition is satisfied after transition to the first driving state, and is configured to limit returning of the driving state of the host vehicle to the second driving state in a case where another rearward vehicle entering a relative position before the rearward vehicle moves in the direction of a vehicle width is recognized by the recognizer.

(13) In the aspect of the above (1), in a case where the host vehicle is operating in the second driving state, the driving controller is configured to transition the driving state of the host vehicle to the first driving state in a case of satisfying a condition including that a first rearward vehicle that is the rearward vehicle traveling in a host lane that is a lane in which the host vehicle travels and a second rearward vehicle that is the rearward vehicle traveling rearward of the host vehicle in a lane adjacent to the host lane move in directions in which the rearward vehicles go away from each other in the direction of a vehicle width.

(14) According to an aspect of this invention, there is provided a vehicle control device including: a recognizer that is configured to recognize a surrounding situation of a host vehicle; and a driving controller that is configured to control acceleration or deceleration and steering of the host vehicle on the basis of a recognition result of the recognizer, wherein the driving controller is configured to cause the host vehicle to operate in at least any of a plurality of driving states including an emergency vehicle avoidance driving state, and transition a driving state of the host vehicle to the emergency vehicle avoidance driving state on the basis of movement of a rearward vehicle that travels rearward of the host vehicle recognized by the recognizer in a direction of a vehicle width in a case where the host vehicle is not operating in the emergency vehicle avoidance driving state.

(15) According to an aspect of this invention, there is provided a vehicle control method including causing a computer to: recognize a surrounding situation of a host vehicle; control acceleration or deceleration and steering of the host vehicle on the basis of a recognition result; control the host vehicle in at least any of a first driving state and a second driving state in which a rate of automation is higher or tasks required of an occupant are fewer than in the first driving state; and transition a driving state of the host vehicle to the first driving state on the basis of movement of a recognized rearward vehicle that travels rearward of the host vehicle in a direction of a vehicle width in a case where the host vehicle is operating in the second driving state.

(16) According to an aspect of this invention, there is provided a storage medium having a program stored therein, the program causing a computer to: recognize a surrounding situation of a host vehicle; control acceleration or deceleration and steering of the host vehicle on the basis of a recognition result; cause the host vehicle to operate in at least any of a first driving state and a second driving state in which a rate of automation is higher or tasks required of an occupant are fewer than in the first driving state; and transition a driving state of the host vehicle to the first driving state on the basis of movement of a recognized rearward vehicle that travels rearward of the host vehicle in a direction of a vehicle width in a case where the host vehicle is operating in the second driving state.

According to the aspects of the above (1) to (16), it is possible to prepare for passage of an emergency vehicle more rapidly.

According to the aspect of the above (3), it is possible to prevent a course change or a lane change of a nearby vehicle from being misdetected as the approach of an emergency vehicle.

According to the aspect of the aspect of the above (7), it is possible to further accurately prevent a course change or a lane change of a nearby vehicle from being misdetected as the approach of an emergency vehicle.

According to the aspect of the aspect of the above (11), it is possible to prompt a driver of a host vehicle to drive so as to avoid an emergency vehicle.

According to the aspect of the aspect of the above (12), it is possible to prevent a host vehicle from interfering with travel of a plurality of emergency vehicles that travel in succession.

According to the aspect of the aspect of the above (13), it is possible to perform control for preparing for an emergency vehicle with limitation to a situation having a higher probability.

DESCRIPTION OF THE INVENTION

Hereinafter, an embodiment of a vehicle control device, a vehicle control method, and a storage medium of the present invention will be described with reference to the accompanying drawings. In the following, a description will be given on the premise of countries or districts in which rules of left-hand traffic are applied, but in a case where rules of right-hand traffic are applied, the right and left may be interchanged when reading.

First Embodiment

[Overall Configuration]

Figure 1:
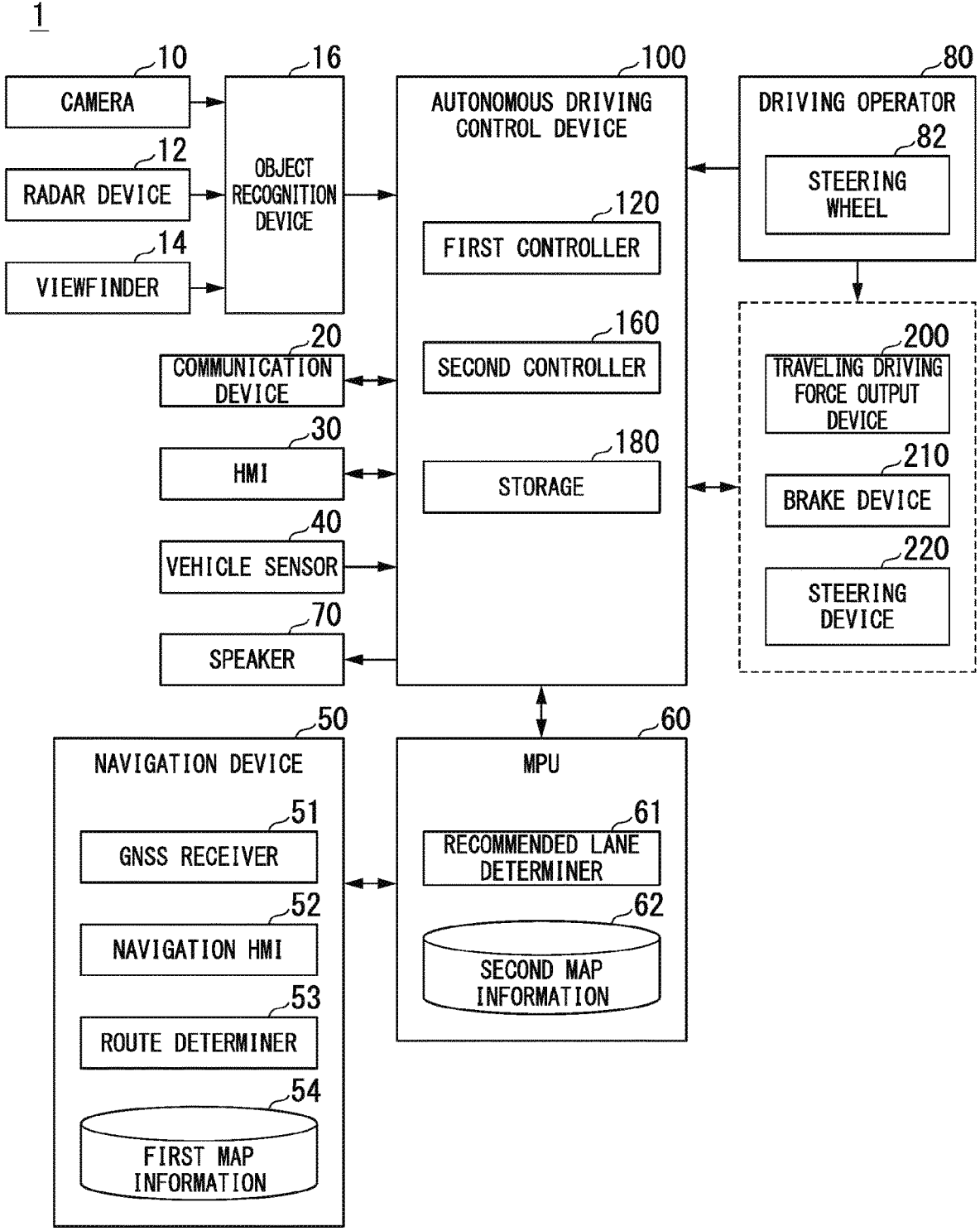
FIG. 1 is a configuration diagram of a vehicle system in which a vehicle control device according to a first embodiment is used.

FIG. 1 is a configuration diagram of a vehicle system 1 in which a vehicle control device according to a first embodiment is used.

A vehicle having the vehicle system 1 mounted therein is, for example, a two-wheeled, three-wheeled, or four-wheeled vehicle or the like, and the driving source thereof is an internal-combustion engine such as a diesel engine or a gasoline engine, an electric motor, or a combination thereof. The electric motor operates using power generated by a generator connected to an internal-combustion engine or discharging power of a secondary battery or a fuel cell.

The vehicle system 1 includes, for example, a camera 10, a radar device 12, a viewfinder 14, an object recognition device 16, a communication device 20, a human machine interface (HMI) 30, a vehicle sensor 40, a navigation device 50, a map positioning unit (MPU) 60, a speaker 70, a driving operator 80, an autonomous driving control device 100, a traveling drive force output device 200, a brake device 210, and a steering device 220. These devices or instruments are connected to each other through a multiplex communication line such as a controller area network (CAN) communication line, a serial communication line, a wireless communication network, or the like. The configuration shown in FIG. 1 is merely an example, and portions of the configuration may be omitted, or other configurations may be further added thereto.

The camera 10 is a digital camera using a solid-state imaging element such as, for example, a charge coupled device (CCD) or a complementary metal oxide semiconductor (CMOS). The camera 10 is installed at any point on a vehicle having the vehicle system 1 mounted therein (hereinafter referred to as a host vehicle M). In a case where a forward image is captured, the camera 10 is installed on the upper portion of the front windshield, the rear surface of the rear-view mirror, or the like. In a case where a backward image is captured, the camera 10 is installed on the upper portion of the rear windshield or the like. The camera 10, for example, repeatedly captures an image of the vicinity of the host vehicle M periodically. The camera 10 may be a stereo camera.

The radar device 12 radiates radio waves such as millimeter waves to the vicinity of the host vehicle M, and detects radio waves (reflected waves) reflected from an object to detect at least the position (distance to and orientation of) of the object. The radar device 12 is installed at any point of the host vehicle M. The radar device 12 may detect the position and speed of an object with a frequency modulated continuous wave (FMCW) system.

The viewfinder 14 is a light detection and ranging (LIDAR) viewfinder. The viewfinder 14 irradiates the vicinity of the host vehicle M with light, and measures scattered light. The viewfinder 14 detects a distance to an object on the basis of a time from light emission to light reception. The irradiation light is, for example, pulsed laser light. The viewfinder 14 is installed at any point on the host vehicle M.

The object recognition device 16 recognizes the position, type, speed, or the like of an object by performing a sensor fusion process on detection results based on some or all of the camera 10, the radar device 12, and the viewfinder 14. The object recognition device 16 outputs recognition result to the autonomous driving control device 100. The object recognition device 16 may output the detection results of the camera 10, the radar device 12, and the viewfinder 14, as they are, to the automated driving control device 100. The object recognition device 16 may be omitted from the vehicle system 1.

The communication device 20 communicates another vehicle which is present in the vicinity of the host vehicle M using, for example, a cellular network, a Wi-Fi network, Bluetooth (registered trademark), dedicated short range communication (DSRC), or the like, or communicates with server devices of various types through a wireless base station.

The HMI 30 provides various types of information for an occupant of the host vehicle M, and accepts the occupant's input operation. The HMI 30 includes various types of display devices, a speaker, a buzzer, a touch panel, a switch, a key, and the like.

The vehicle sensor 40 includes a vehicle speed sensor that detects the speed of the host vehicle M, an acceleration sensor that detects an acceleration, a yaw rate sensor that detects an angular velocity around a vertical axis, an orientation sensor that detects the direction of the host vehicle M, or the like.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 specifies the position of the host vehicle M on the basis of a signal received from a GNSS satellite. The position of the host vehicle M may be specified or complemented by an inertial navigation system (INS) in which an output of the vehicle sensor 40 is used. The navigation HMI 52 includes a display device, a speaker, a touch panel, a key, and the like. A portion or the entirety of the navigation HMI 52 may be shared with the above-described HMI 30. The route determiner 53 determines, for example, a route (hereinafter, a route on a map) from the position (or any input position) of the host vehicle M specified by the GNSS receiver 51 to a destination input by an occupant using the navigation HMI 52 with reference to the first map information 54. The first map information 54 is, for example, information in which a road shape is represented by a link indicating a road and nodes connected by the link. The first map information 54 may include the curvature of a road, point of interest (POI) information, or the like.

The route on a map is output to the MPU 60. The navigation device 50 may perform route guidance using the navigation HMI 52 on the basis of the route on a map. The navigation device 50 may be realized by the function of a terminal device such as, for example, a smartphone or a tablet terminal possessed by an occupant. The navigation device 50 may transmit its current position and destination to a navigation server through the communication device 20, and acquire the same route as the route on a map from the navigation server.

The MPU 60 includes, for example, a recommended lane determiner 61, and holds second map information 62 in a storage device such as an HDD or a flash memory. The recommended lane determiner 61 divides the route on a map provided from the navigation device 50 into a plurality of blocks (for example, divides the route on a map every 100 [m] in a vehicle traveling direction), and determines a recommended lane for each block with reference to the second map information 62. The recommended lane determiner 61 makes a decision on which lane from the left to travel along.

In a case where a branch point is present in the route on a map, the recommended lane determiner 61 determines a recommended lane so that the host vehicle M can travel along a rational route for advancing to a branch destination.

The second map information 62 is map information having a higher accuracy than that of the first map information 54. The second map information 62 includes, for example, information of the center of a lane, information of the boundary of a lane, or the like. The second map information 62 may include road information, traffic regulations information, address information (address or zip code), facility information, telephone number information, or the like. The second map information 62 may be updated at any time by the communication device 20 communicating with another device.

The speaker 70 is operated by control of the autonomous driving control device 100, and outputs a sound. This sound includes a voice for notifying an occupant of the host vehicle M of the approach of an emergency vehicle or the like. The details of content which is notified of by the speaker 70 will be described later. The speaker 70 is an example of a "notifier."

The driving operator 80 includes, for example, an accelerator pedal, a brake pedal, a shift lever, a steering wheel, a variant steering wheel, a joystick, a blinker lever, a microphone, various types of switches, or the like. A sensor that detects the amount of operation or the presence or absence of operation is installed on the driving operator 80, and the detection results are output to the automated driving control device 100, or some or all of the traveling driving force output device 200, the brake device 210, and the steering device 220.

The autonomous driving control device 100 includes, for example, a first controller 120, a second controller 160, and a storage 180. The first controller 120 and the second controller 160 are realized by a hardware processor such as, for example, a central processing unit (CPU) executing a program (software). Some or all of these components may be realized by hardware (circuit unit; including circuitry) such as a large scale integration (LSI), an application specific integrated circuit (ASIC), a field-programmable gate array (FPGA), or a graphics processing unit (GPU), and may be realized by cooperation between software and hardware. The program may be stored in a storage device such as the HDD or the flash memory of the storage 180 in advance, may be stored in a detachable storage medium such as a DVD or a CD-ROM, or may be installed in the HDD or the flash memory of the automated driving control device 100 by the storage medium being mounted in a drive device.

Figure 2:
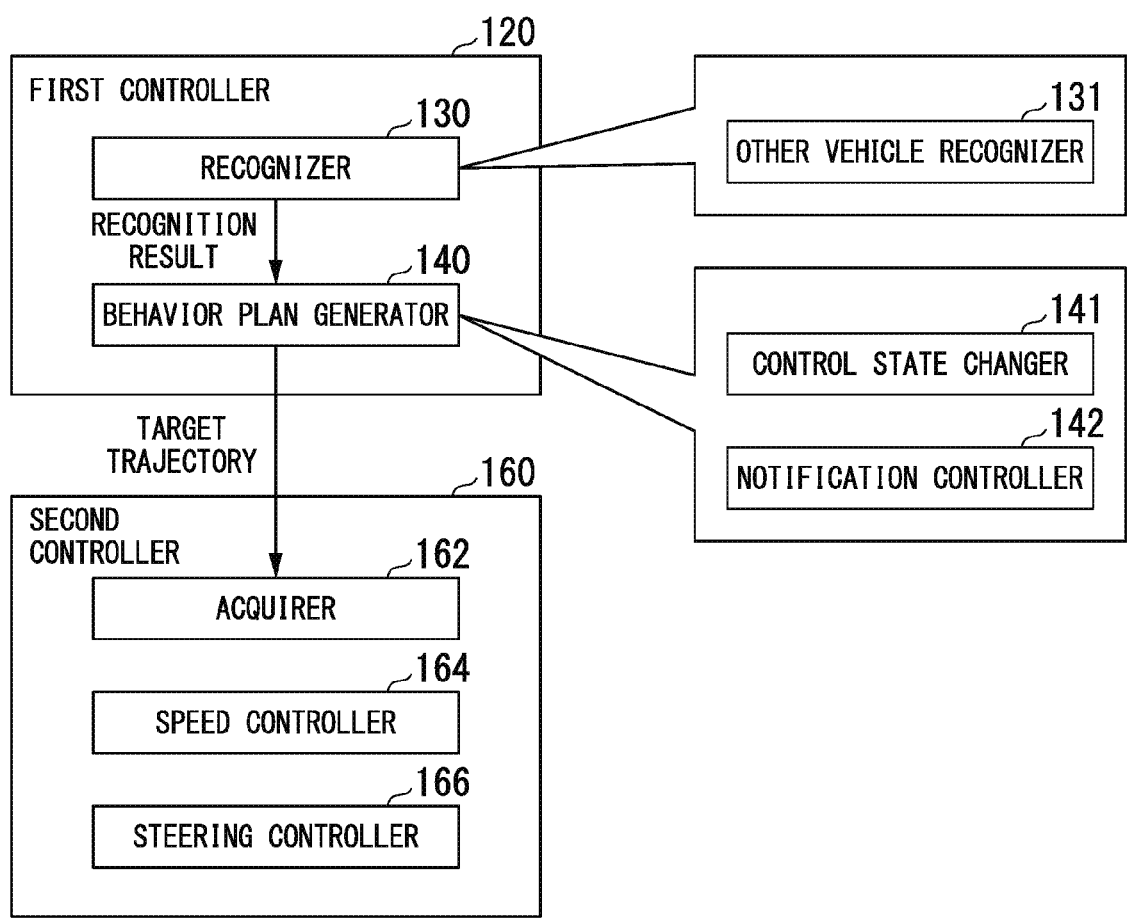
FIG. 2 is a functional configuration diagram of a first controller and a second controller.

FIG. 2 is a functional configuration diagram of the first controller 120 and the second controller 160. The first controller 120 includes, for example, a recognizer 130 and a behavior plan generator 140. The first controller 120 concurrently realizes, for example, a function based on artificial intelligence (AI) and a function based on a model imparted in advance. For example, a function of "recognizing a point of intersection" may be realized by the recognition of a point of intersection based on deep leaning or the like and recognition based on conditions (such as a signal capable of pattern matching or a road sign) imparted in advance being concurrently executed, and being comprehensively evaluated by performing scoring on both. Thereby, the reliability of automated driving is secured.

The recognizer 130 recognizes the position and speed of an object which is present in the vicinity of the host vehicle M, and the state of acceleration or the like on the basis of information which is input from the camera 10, the radar device 12, and the viewfinder 14 through the object recognition device 16. The object includes another vehicle. The position of the object is recognized as, for example, a position in absolute coordinates with a representative point (such as the centroid or the center of a drive shaft) of the host vehicle M as an origin, and is used in control. The position of the object may be represented by a representative point such as the centroid or a corner of the object, or may be represented by a representative region. The "state" of the object may include the acceleration or jerk of the object, or "behavior state" (for example, whether performing or attempting to perform lane change).

The recognizer 130 recognizes, for example, a lane (traveling lane) along which the host vehicle M travels. For example, the recognizer 130 may recognize a traveling lane by comparing a pattern of a road partition line (for example, an array of solid lines and broken lines) obtained from the second map information 62 with a pattern of a road partition line located in the vicinity of the host vehicle M which is recognized from an image captured by the camera 10. The recognizer 130 may recognize a traveling lane by recognizing a driving boundary (road boundary) including a road partition line, a shoulder, a curbstone, a median strip, a guardrail, or the like without being limited to the recognition of a road partition line. In this recognition, the position of the host vehicle M acquired from the navigation device 50 or processing results based on an INS may be added. The recognizer 130 recognizes a stop line, an obstacle, a red light, a tollbooth, and other road events.

On recognizing a traveling lane, the recognizer 130 recognizes the position or posture of the host vehicle M with respect to the traveling lane. The recognizer 130 may recognize, for example, deviation from the center of the lane of the host vehicle M which is a representative point, and an angle formed with respect to a line aligned along the center of the lane of the host vehicle M in its traveling direction, as the relative position and posture of the host vehicle M with respect to the traveling lane. Instead thereof, the recognizer 130 may recognize the position of the representative point of the host vehicle M or the like with respect to either lateral end portion (a road partition line or a road boundary) of the traveling lane, as the relative position of the host vehicle M with respect to the traveling lane.

The recognizer 130 may include further an another vehicle recognizer 131. The another vehicle recognizer 131 recognizes an operation of another vehicle that travels in the vicinity of the host vehicle M on the basis of an image captured by the camera 10.

The behavior plan generator 140 generates a target trajectory along which the host vehicle M will travel in the future automatically (irrespective of a driver's operation) so that the host vehicle M travels along the recommended lane decided by the recommended lane determiner 61 in principle and can cope with its peripheral situation. The target trajectory includes, for example, a speed element. For example, the target trajectory may be represented as a trajectory obtained by arranging points (trajectory points) at which the host vehicle M will arrive in order. The trajectory points are points at which the host vehicle M will arrive after predetermined traveling distances (for example, approximately every several [m]) which is a distance along a road. Separately from the trajectory points, a target speed and a target acceleration for each predetermined sampling time (for example, approximately zero comma several [sec]) are generated as a portion of the target trajectory. The trajectory points may be positions at which the host vehicle M will arrive at sampling times for respective predetermined sampling times. In this case, information of target speed or target acceleration is represented by an interval between trajectory points.

The behavior plan generator 140 may set automated driving events when generating a target trajectory. Examples of automated driving events include a constant-speed traveling event, a low-speed following traveling event in which travel following a preceding vehicle at a predetermined vehicle speed (for example, 60 [km]) or lower is performed, a lane change event, a diverging event, a merging event, an overtaking event, and the like. The behavior plan generator 140 generates a target trajectory according to a started event.

The behavior plan generator 140 includes a control state changer 141 and a notification controller 142.

The control state changer 141 causes the host vehicle M to operate in at least any of a first driving state and a second driving state. The first driving state is a driving state in which at least a task of a forward gaze is imposed on a driver. The second driving state is a driving state in which a task imposed on a driver is further reduced than in the first driving state (that is, a rate of automation is higher than in the first driving state). For example, the first driving state is autonomous driving of a low level, and is a driving state in which a task for grasping a steering wheel 82 is imposed on a driver as necessary. The second driving state is autonomous driving of a higher level than in the first driving state, and is a driving state in which a task for grasping the steering wheel 82 is not imposed on a driver.

In a case where the first driving state is a state in which a driver performs manual driving, or a state in which an advanced driver assistance system (ADAS) is operating, the second driving state may be a state in which autonomous driving is being performed. The ADAS is a driving assistance system which is represented by an adaptive cruise control system (ACC) or a lane keeping assist system (LKAS).

In a case where the host vehicle M is operating in the second driving state, the control state changer 141 transitions the driving state of the host vehicle M to the first driving state on the basis of the movement of a rearward vehicle mr recognized by the another vehicle recognizer 131 in the width direction of a vehicle. In a case where a predetermined condition is satisfied after transition to the first driving state, the control state changer 141 returns the driving state of the host vehicle to the second driving state. The details of a process of transitioning the driving state of the host vehicle M from the second driving state to the first driving state and the details of a predetermined condition in which the driving state is returned from the first driving state to the second driving state will be described later.

In a case where the driving state of the host vehicle M is changed to the first driving state by the control state changer 141, and then the recognition result of the another vehicle recognizer 131 shows that an emergency vehicle eV has approached, the notification controller 142 notifies a driver of the host vehicle M of a request for avoidance control for avoiding the emergency vehicle eV.

The second controller 160 controls the traveling driving force output device 200, the brake device 210, and the steering device 220 so that the host vehicle M passes along the target trajectory generated by the behavior plan generator 140 according to scheduled times.

The second controller 160 includes, for example, an acquirer 162, a speed controller 164, and a steering controller 166. The acquirer 162 acquires information of the target trajectory (trajectory point) generated by the behavior plan generator 140, and stores the acquired information in a memory (not shown). The speed controller 164 controls the traveling driving force output device 200 or the brake device 210 on the basis of a speed element associated with the target trajectory stored in the memory. The steering controller 166 controls the steering device 220 in accordance with the bent state of the target trajectory stored in the memory. The processes of the speed controller 164 and the steering controller 166 are realized by, for example, a combination of feedforward control and feedback control. As an example, the steering controller 166 executes a combination of feedforward control according to the curvature of a road in front of the host vehicle M and feedback control based on deviation from the target trajectory. A combination of the control state changer 141 and the second controller 160 is an example of a "driving controller."

The traveling driving force output device 200 outputs a traveling driving force (torque) for a vehicle to travel to a driving wheel. The traveling driving force output device 200 includes, for example, a combination of an internal-combustion engine, an electric motor, a transmission or the like, and an ECU that controls these components. The ECU controls the above components in accordance with information which is input from the second controller 160 or information which is input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor in accordance with the information which is input from the second controller 160 or the information which is input from the driving operator 80, and causes a brake torque according to a braking operation to be output to each wheel. The brake device 210 may include a mechanism, which transfers hydraulic pressure generated by the operation of a brake pedal included in the driving operator 80 through a master cylinder to the cylinder, as a backup. The brake device 210 is not limited to the above-described configuration, and may be an electronic control type hydraulic brake device that controls an actuator in accordance with the information which is input from the second controller 160 and transfers hydraulic pressure of the master cylinder to the cylinder.

The steering device 220 includes, for example, a steering ECU and an electric motor.

The electric motor changes the direction of a turning wheel, for example, by causing a force to act on a rack and pinion mechanism. The steering ECU drives the electric motor in accordance with the information which is input from the second controller 160 or the information which is input from the driving operator 80, and changes the direction of the turning wheel.

[Change of Driving State]

Hereinafter, content of a process performed by the control state changer 141 will be described. First, in a case where an emergency vehicle approaches from the rear during travel of the host vehicle M, it is preferable that the host vehicle M travel with an offset to either side in a width direction so as not to interfere with travel of the emergency vehicle. The emergency vehicle is, for example, a vehicle that needs to travel with preference over general vehicles, and is a vehicle having a siren or a lamp indicating it as an emergency vehicle, such as an ambulance, a police vehicle, or a fire truck. However, control of traveling with an offset in order to clear the travel route of an emergency vehicle while also preventing interference with nearby general vehicles may have a high degree of difficulty in terms of autonomous driving, and in some cases there is a need for a rapid overtake or a need to travel off of a roadway (for example, on a road shoulder) without obtaining a driver's consent. Consequently, when it is estimated that an emergency vehicle approaches from behind during travel of the host vehicle M on the basis of the movement of a rearward vehicle in the direction of a vehicle width, the host vehicle M is set to be in the first driving state in which the steering wheel 82 is required to be grasped as described above. Thereby, the host vehicle M can prepare for passage of an emergency vehicle more rapidly.

For example, in a case where the movement of the rearward vehicle mr in the direction of a vehicle width is recognized, and there is movement in the direction of a vehicle width, the other vehicle recognizer 131 recognizes the amount of offset from the center of a lane in which the rearward vehicle mr travels.

The other vehicle recognizer 131 also recognizes the presence or absence of an adjacent lane in which the rearward vehicle mr can travel adjacent to a lane in which the rearward vehicle mr travels. The adjacent lane in which the rearward vehicle mr can travel is a lane adjacent to a side on which the rearward vehicle mr is offset with respect to a lane in which the rearward vehicle mr is traveling, and a lane in which a vehicle in the same traveling direction as the rearward vehicle mr travels (that is, not an opposite lane). Hereinafter, this lane is referred to as an offset-side adjacent lane.

In a case where the rearward vehicle mr travels in a lane in which the host vehicle M travels (hereinafter, a host lane), the amount of offset of the rearward vehicle mr may be the amount of offset from the center of the host vehicle M, or the amount of offset from a traveling trajectory obtained by lining up positions where the host vehicle M has traveled so far, instead of the amount of offset from the center of a lane.

In the first embodiment, in a case where the host vehicle M is operating in the second driving state, the control state changer 141 transitions the driving state of the host vehicle M to the first driving state, on the condition that there is no offset-side adjacent lane, on the basis of the movement of the rearward vehicle mr recognized by the other vehicle recognizer 131 in the direction of a vehicle width. Hereinafter, the details of a situation in which the control state changer 141 transitions the driving state of the host vehicle M from the second driving state to the first driving state will be described.

Figure 3:
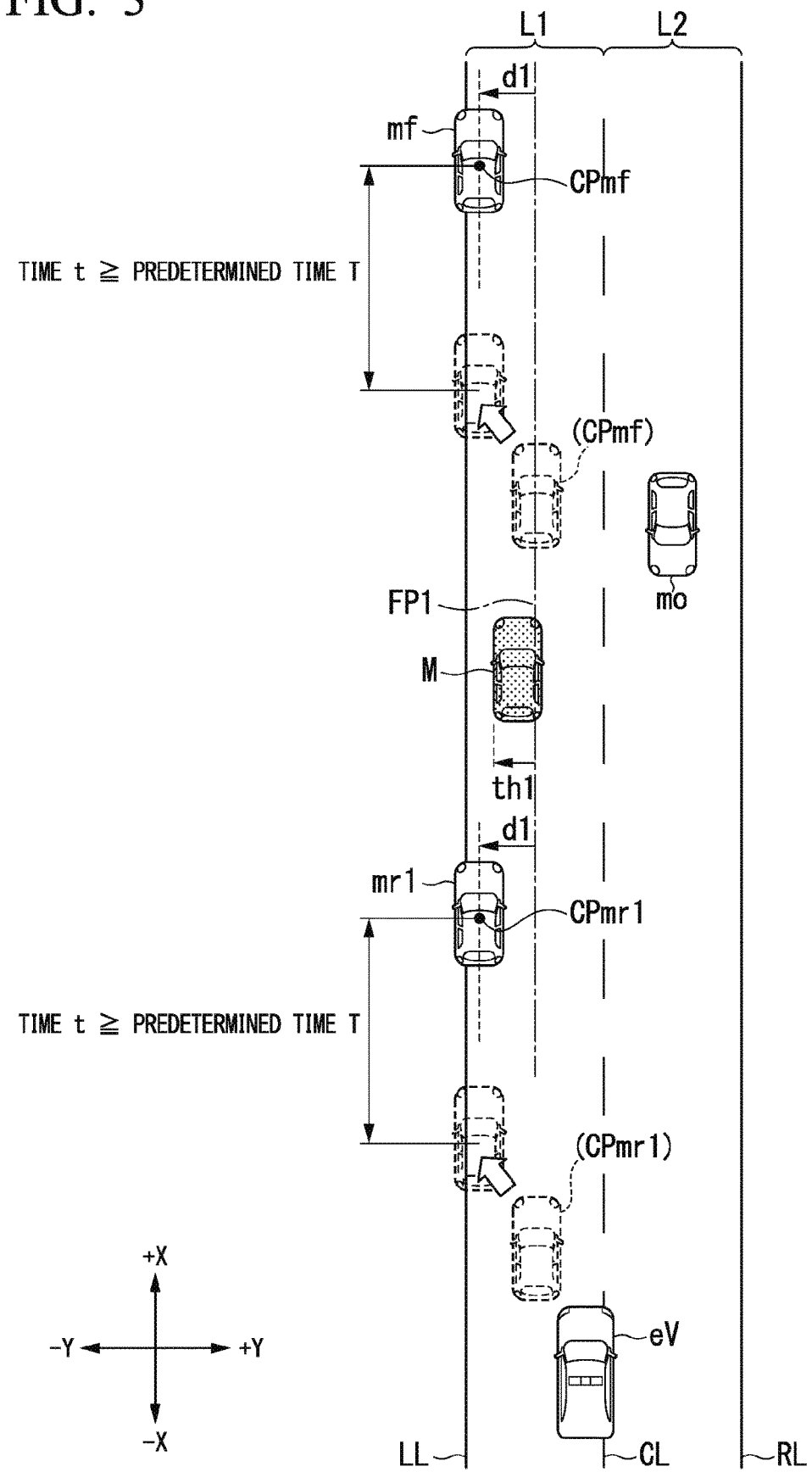
FIG. 3 is a diagram showing an example of leftward movement of a first rearward vehicle according to the first embodiment.

FIG. 3 is a diagram showing an example of leftward movement of the first rearward vehicle mr1 according to the first embodiment. In the following description, X represents the extending direction of a road, and Y represents the direction of a vehicle width orthogonal to the X direction. The +X direction represents the traveling direction of the host vehicle M, the −X direction represents the rear of the host vehicle M, the −Y direction represents a leftward direction in the traveling direction of the host vehicle M, and the +Y direction represents a rightward direction in the traveling direction of the host vehicle M.

In FIG. 3, a first lane L1 is a lane which is partitioned by a road partition line LL and a road partition line CL, and is a lane in which a vehicle moving ahead in the +X direction travels. A second lane L2 is a lane which is partitioned by the road partition line CL and a road partition line RL, and is an opposite lane of the first lane L1 (that is, a lane in which a vehicle moving ahead in the −X direction (an opposite vehicle mo shown in the drawing) travels). Therefore, in FIG. 3, there is no adjacent lane in the same direction in the first lane L1, and thus it is also not possible for there to be an offset-side adjacent lane. There is a road shoulder on the left side of the first lane L1. The emergency vehicle eV travels, for example, between the first lane L1 and the second lane L2. Hereinafter, a case where the traveling route of the emergency vehicle eV is cleared by the rearward vehicle mr being offset leftward in the first lane L1 will be described. In a case where there is a road shoulder on the right side of the host lane, right and left in the following description may be interchanged when reading.

In a case where the emergency vehicle eV approaches, the first rearward vehicle mr1 is offset, for example, leftward in order to allow the emergency vehicle eV to go ahead, and travels on the left end of the first lane L1 or a road shoulder on the left side of the first lane L1. The other vehicle recognizer 131 recognizes the leftward movement of the first rearward vehicle mr1 on the basis of an image captured by the camera 10, and recognizes the amount of offset of the first rearward vehicle mr1 (a distance from a lane central line FP1 of the first lane L1 to a central point CPmr1 of the first rearward vehicle mr1) as the amount of leftward offset d1. The recognizer 130 recognizes that there is no adjacent lane in the same direction in a lane in which the first rearward vehicle mr1 travels (that is, the first lane L1 (host lane)) on the basis of the position of the host vehicle M recognized by the navigation device 50, the second map information 62, an image captured by the camera 10, and the like. Therefore, it is also not possible for there to be an offset-side adjacent lane.

In a case where the host vehicle M is operating in the second driving state, and there is no offset-side adjacent lane in the first rearward vehicle mr1, the control state changer 141 transitions the driving state of the host vehicle M from the second driving state to the first driving state when the following conditions 1 and 2 are satisfied. The condition 1 is an example of a first reference, and the condition 2 is an example of a second reference.

(Condition 1) The amount of offset of the first rearward vehicle mr1 recognized by the other vehicle recognizer 131 is equal to or greater than a first threshold th1.

(Condition 2) A traveling state while maintaining a state in which the amount of offset is equal to or greater than the first threshold th1 continues for a predetermined time T or more, or travel continues for a predetermined distance or more while maintaining a state in which the amount of offset is equal to or greater than the first threshold th1.

In a case where the amount of offset is less than the first threshold th1 even when the rearward vehicle mr moves in the direction of a vehicle width, or in a case where a time of traveling with an offset is less than the predetermined time T even when the amount of offset is equal to or greater than the first threshold th1, the control state changer 141 regards the case as simple wobble traveling, and does not change the driving state of the host vehicle M at that point in time.

The control state changer 141 may change the first threshold th1 to a small value or change the predetermined time T to a short time on the basis of the surrounding environment in which the host vehicle M is traveling. For example, to a case where the host lane of the host vehicle M is narrow, the host lane is two lanes of one-way traffic on one side, the host vehicle M travels on a branch route or an interchange junction, or the like, the control state changer 141 may change the first threshold th1 to a small value or change the predetermined time T to a short time as compared with a case where the vehicle travels in other lanes. The control state changer 141 may change the first threshold th1 to a small value or change the predetermined time T to a short time in accordance with the weather or a road surface condition (for example, in a case where, during rain or snowfall, the road surface is wet, the road surface is icy, or snow has accumulated on the road surface).

In a case where a condition 3: that the speed and position of the first rearward vehicle mr1 is detected, the first rearward vehicle mr1 decelerates, or an inter-vehicle distance from the first rearward vehicle mr1 increases, is further satisfied in addition to the conditions 1 and 2, the control state changer 141 may transition the driving state of the host vehicle M from the second driving state to the first driving state.

In a case where the recognizer 130 recognizes that a forward vehicle traveling in front of the host vehicle M (a forward vehicle mf shown in the drawing) performs the same deceleration as the rearward vehicle mr or stops, the control state changer 141 may change the first threshold th1 to a small value or change the predetermined time T to a short time. In this case, the control state changer 141 may add a predetermined time to the predetermined time T without changing the first threshold th1.

[Notification Process of Notification Controller 142]

Figure 4:
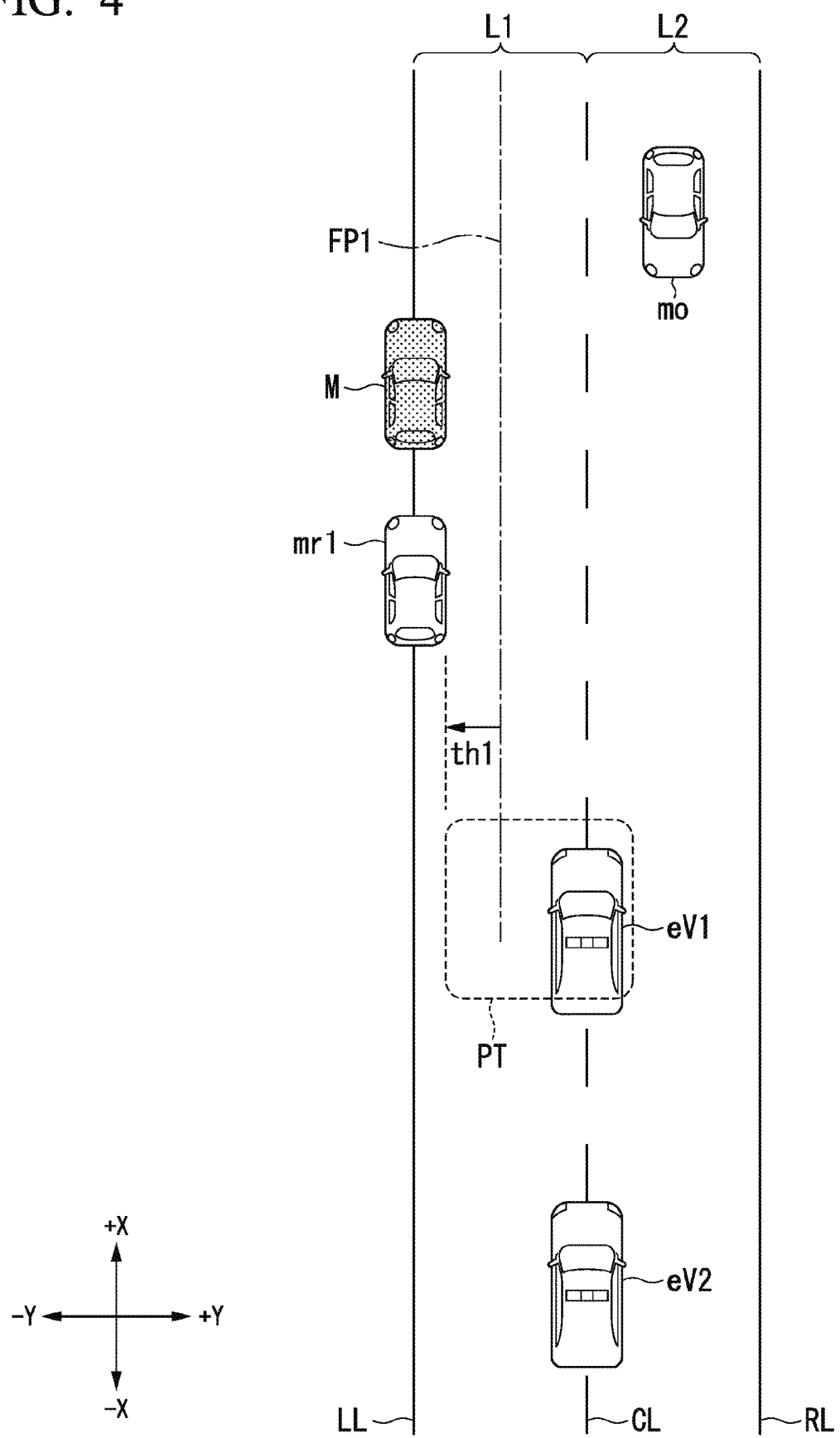
FIG. 4 is a diagram schematically showing a process of a notification controller according to the first embodiment.

FIG. 4 is a diagram schematically showing a process of the notification controller 142 according to the first embodiment. In a case where the driving state of the host vehicle M is changed from the second driving state to the first driving state by the control state changer 141, and then vehicles other than the rearward vehicle mr enter a relative position (hereinafter referred to as a relative position PT) present before the rearward vehicle mr determined to satisfy the (condition 1) and the (condition 2) is offset, the notification controller 142 regards the other vehicles as the emergency vehicle eV, and determines that the emergency vehicle eV approaches.

In this stage, since there is a high possibility of the emergency vehicle eV coming to a position which can be captured by a camera of the host vehicle M, the emergency vehicle eV may be confirmed on the basis of a result or the like obtained by collecting a captured image or a siren sound. The relative position PT can be simply defined, for example, as a lateral position of the rearward vehicle mr, and a position on the opposite side of a side on which the rearward vehicle mr is offset.

In a case where it is determined that the emergency vehicle eV has approached, the notification controller 142 causes the speaker 70 to output, for example, voice information stored in the storage 180 in advance, and notifies a driver of the host vehicle M of a request for avoidance control for avoiding the emergency vehicle eV. The voice information includes information indicating a voice such as, for example, "an emergency vehicle is approaching. Please perform avoidance driving for avoiding the emergency vehicle." The above-mentioned voice is an example and the voice is not limited thereto. The voice may be any other sound or voice in a case that can notify the driver of the host vehicle M of avoidance control for an emergency vehicle. A notification may be performed through light emission, display, vibration, or the like without being limited to a notification based on a voice.

[Process for Control State Changer 141 to Perform Return from First Driving State to Second Driving State]

Figure 5:
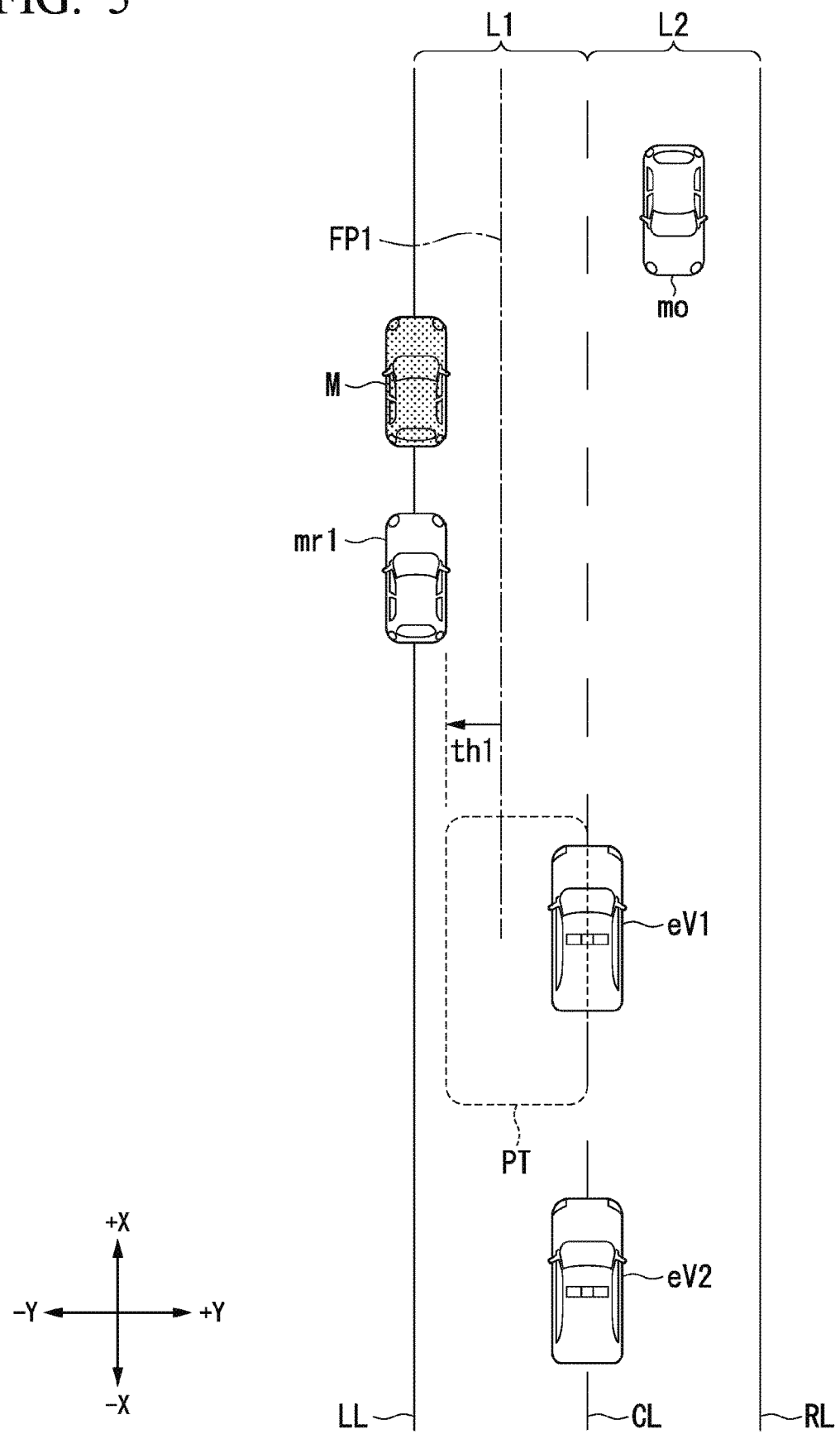
FIG. 5 is a diagram showing an example of traveling of an emergency vehicle according to the first embodiment.

The control state changer 141 determines the presence or absence of another rearward vehicle entering the relative position PT on the basis of the recognition result of the other vehicle recognizer 131, limits returning of the driving state of the host vehicle M to the second driving state until there is no other rearward vehicle entering the relative position PT, and returns the driving state of the host vehicle M from the first driving state to the second driving state in a case where there is no other rearward vehicle entering the relative position PT. FIG. 5 is a diagram showing an example of travel of the emergency vehicle eV according to the first embodiment. In FIG. 5, the host vehicle M and the first rearward vehicle mr1 travel with an offset to the left end of the first lane L1 with the approach of the emergency vehicle eV. Here, a plurality of emergency vehicles eV may travel in succession. In FIG. 5, two emergency vehicles eV (emergency vehicles eV1 to eV2 shown in the drawing) travel between the first lane L1 and the second lane L2. Here, when being passed by the emergency vehicle eV1 after the driving state of the host vehicle M is transitioned from the second driving state to the first driving state, it may not be possible to prepare for passage of the emergency vehicle eV2 in a case where the driving state of the host vehicle M is returned from the first driving state to the second driving state. The control state changer 141 prevents the driving state of the host vehicle M from being returned to the second driving state until there is no other vehicle entering the relative position PT, and thus it is possible for the host vehicle M to prepare for passage of the emergency vehicle eV2.

[Operation of Autonomous Driving Control Device 100]

Figure 6:
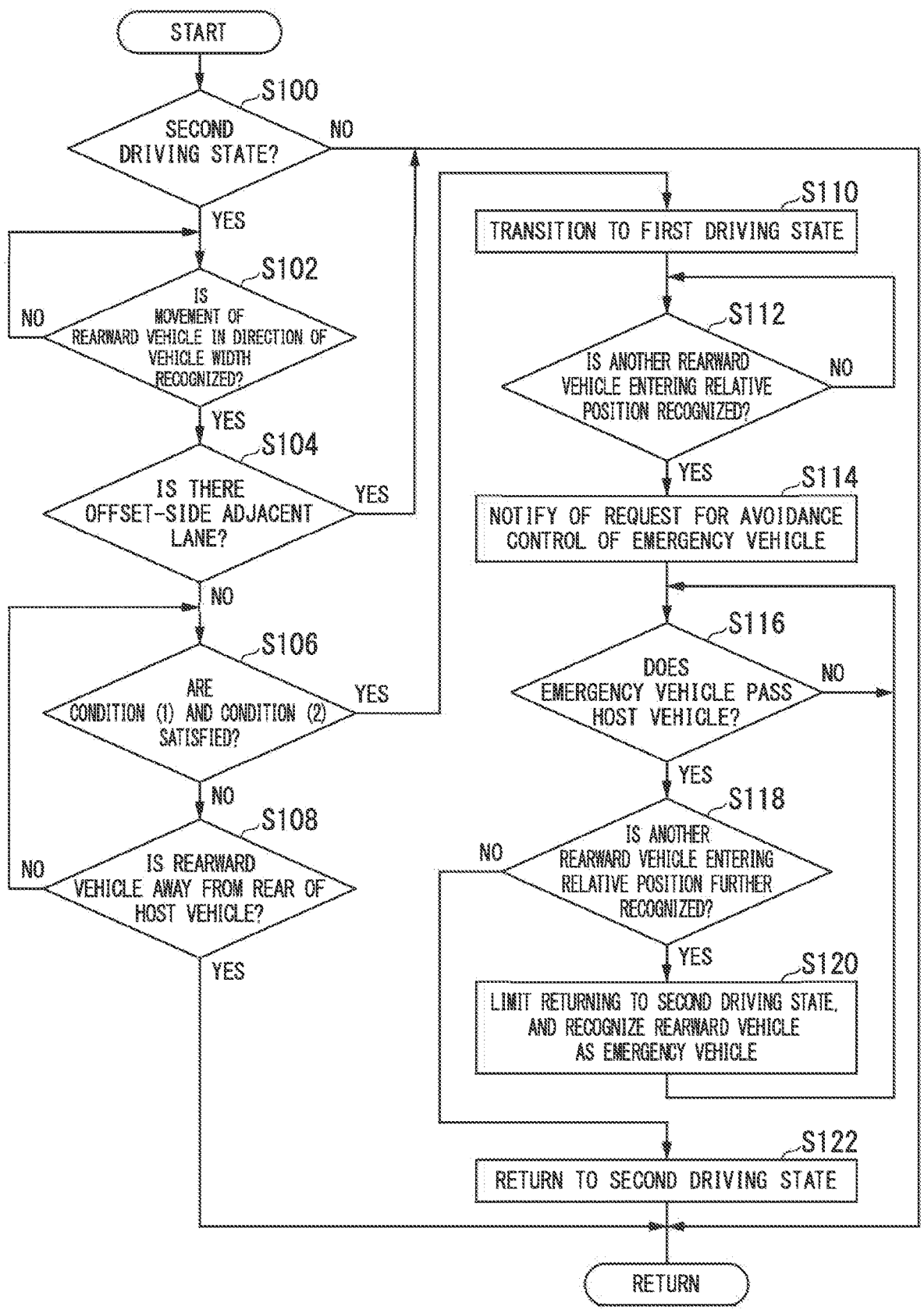
FIG. 6 is a flow chart showing an example of an operation of an autonomous driving control device according to the first embodiment.

FIG. 6 is a flow chart showing an example of an operation of the autonomous driving control device 100 according to the first embodiment. First, the control state changer 141 determines whether the host vehicle M is operating in the second driving state (step S100). In a case where it is determined that the host vehicle M is operating in the first driving state, the control state changer 141 does not need to perform a process for transition from the second driving state to the first driving state, and thus the process is ended. In a case where it is determined that the host vehicle M is operating in the second driving state, the control state changer 141 determines whether the rearward vehicle mr moves in the direction of a vehicle width on the basis of the recognition result of the other vehicle recognizer 131 (step S102).

The control state changer 141 stands by until the recognition result of the other vehicle recognizer 131 shows that the rearward vehicle mr moves in the direction of a vehicle width.

In a case the recognition result of the other vehicle recognizer 131 is shown that the rearward vehicle mr moves in the direction of a vehicle width, the control state changer 141 determines whether there is an offset-side adjacent lane (step S104). In a case where there is an offset-side adjacent lane, it is difficult for the control state changer 141 to determine whether the rearward vehicle mr has moved in the direction of a vehicle width with its offset or has moved in the direction of a vehicle width with a lane change, whereby the subsequent process is not performed with the driving state of the host vehicle M maintained in the second driving state, and the process is ended.

In a case where the rearward vehicle mr moves in the direction of a vehicle width and there is no offset-side adjacent lane, the control state changer 141 determines whether the amount of offset of the rearward vehicle mr is equal to or greater than the first threshold th1 (condition 1), and a traveling state in which the (condition 1) is satisfied (that is, the continuation aspect of the (condition 1)) continues for the predetermined time T or more (condition 2) (step S106).

In a case where the amount of offset of the rearward vehicle mr is not equal to or greater than the first threshold th1 (that is, the (condition 1) is not satisfied), and the rearward vehicle does not travel for the predetermined time T or more in a state in which the amount of offset is equal to or greater than the first threshold th1 (that is, the (condition 2) is not satisfied), the control state changer 141 determines whether the rearward vehicle mr is away from the rear of the host vehicle M (step S108). The rearward vehicle mr being away from the rear of the host vehicle M includes, for example, the rearward vehicle mr passing the host vehicle M, the rearward vehicle mr traveling at positions other than the rear of the host vehicle M with a course change, the rearward vehicle mr stopping and not being in a recognition range of the other vehicle recognizer 131, or the like.

In a case where the rearward vehicle mr is not away from the rear of the host vehicle M, the control state changer 141 advances the process to step S106, and repeats the processes of steps S106 to S108 until the rearward vehicle mr satisfies the (condition 1) and the (condition 2). In a case where it is determined that the rearward vehicle mr is away from the rear of the host vehicle M, the control state changer 141 regards the rearward vehicle mr as performing simple wobble traveling, and the process is ended. In a case where the rearward vehicle mr satisfies the (condition 1), and the (condition 2), the control state changer 141 transitions the driving state of the host vehicle M from the second driving state to the first driving state (step S110).

Next, the notification controller 142 determines whether another rearward vehicle entering the relative position PT has been recognized on the basis of the recognition result of the other vehicle recognizer 131 (step S112). The notification controller 142 stands by until the other rearward vehicle entering the relative position PT is recognized. In a case where it is determined that the other rearward vehicle entering the relative position PT is recognized, the notification controller 142 regards the other rearward vehicle as the emergency vehicle eV, and notifies of a request for avoidance control of the emergency vehicle eV (step S114). The notification controller 142 causes the speaker 70 to output, for example, a voice of a request for avoidance control for avoiding the emergency vehicle eV to a driver of the host vehicle M.

Next, the control state changer 141 determines whether the emergency vehicle eV has passed the host vehicle M (step S114). For example, in a case where a vehicle having a feature of the emergency vehicle eV is shown in a time-series image captured by the camera 10, and it is shown that the vehicle moves from the rear of the host vehicle M to the front thereof in a time-series manner, the control state changer 141 determines that the emergency vehicle eV has passed the host vehicle M. The control state changer 141 stands by until the emergency vehicle eV passes the host vehicle M.

In a case where it is determined that the emergency vehicle eV has passed the host vehicle M, the control state changer 141 determines whether another rearward vehicle entering the relative position PT (for example, another rearward emergency vehicle eV) has been further recognized on the basis of the recognition result of the other vehicle recognizer 131 (step S118). In a case where it is determined that another rearward vehicle entering the relative position PT has been recognized, the control state changer 141 limits returning of the driving state of the host vehicle M to the second driving state, regards the other rearward vehicle as the emergency vehicle eV, and advances the process to step S118. In a case where it is determined that another rearward vehicle entering the relative position PT has not been recognized, the control state changer 141 returns the driving state of the host vehicle M from the first driving state to the second driving state (step S122).

In a case where it is not determined in step S116 that the emergency vehicle eV has passed the host vehicle M for a predetermined time or more, the control state changer 141 regards a reason for the rearward vehicle mr being offset as not being due to the approach of the emergency vehicle eV, and the process may be ended.

Conclusion of First Embodiment

As described above, the autonomous driving control device 100 of the present embodiment includes a recognizer that recognizes a surrounding situation of the host vehicle M (in this example, the other vehicle recognizer 131) and a driving controller that controls acceleration or deceleration and steering of the host vehicle M (the control state changer 141 and the second controller 160) on the basis of a recognition result of the other vehicle recognizer 131, and the control state changer 141 causes the host vehicle M to operate in at least any of a first driving state and a second driving state in which a rate of automation is higher or tasks required of an occupant are fewer than in the first driving state, and transitions a driving state of the host vehicle M to the first driving state on the basis of the movement of the rearward vehicle mr that travels rearward of the host vehicle M recognized by the other vehicle recognizer 131 in a direction of a vehicle width in a case where the host vehicle M is operating in the second driving state, whereby it is possible to prepare for passage of an emergency vehicle more rapidly.

In the autonomous driving control device 100 of the present embodiment, the other vehicle recognizer 131 further recognizes the presence or absence of a lane that enables the rearward vehicle mr to enter a side on which the rearward vehicle mr is offset in the direction of a vehicle width, and in a case where the host vehicle is operating in the second driving state, the control state changer 141 maintains the driving state of the host vehicle M in the second driving state in a case where the amount of offset of the rearward vehicle mr recognized by the other vehicle recognizer 131 in the direction of a vehicle width satisfies a reference and it is recognized that there is an entrance enabling lane, and transitions the driving state of the host vehicle M to the first driving state in a case where the amount of offset of the rearward vehicle mr recognized by the other vehicle recognizer 131 in the direction of a vehicle width satisfies a reference and it is not recognized that there is an entrance enabling lane, the driving state of the host vehicle M being transitioned to the first driving state in a case where the reference of the amount of offset of the rearward vehicle mr in the direction of a vehicle width is that the amount of offset of the rearward vehicle mr recognized by the other vehicle recognizer 131 in the direction of a vehicle width equal to or greater than a first threshold th1, and a state in which a first reference is satisfied continues for a predetermined time T or more or a predetermined distance X or more, whereby it is possible to prevent the movement of the rearward vehicle mr with a lane change or a simple wobble from being misdetected as the approach of the emergency vehicle eV.

The autonomous driving control device 100 of the present embodiment further includes the notification controller 142 that causes the speaker 70 to notify a driver of the host vehicle M of a request for avoidance control for avoiding a rearward vehicle in a case where another rearward vehicle entering the relative position PT before the rearward vehicle mr moves in the direction of a vehicle width is recognized by the other vehicle recognizer 131, whereby it is possible to allow the driver of the host vehicle M to prepare for passage of an emergency vehicle more rapidly.

In the autonomous driving control device 100 of the present embodiment, the control state changer 141 returns the driving state of the host vehicle M to the second driving state in a case where a predetermined condition (in this example, the emergency vehicle eV passing the host vehicle M) is satisfied after transition to the first driving state, and limits returning of the driving state of the host vehicle M to the second driving state in a case where another rearward vehicle entering the relative position PT is recognized by the other vehicle recognizer 131, whereby it is possible to allow the driver of the host vehicle M to prepare for passage of a plurality of emergency vehicles eV even in a case where emergency vehicles eV travel in succession.

Second Embodiment

Hereinafter, a second embodiment will be described. In the first embodiment, a case where the control state changer 141 performs a determination when the driving state of the host vehicle M is transitioned on the basis of the condition 1 and the condition 2 has been described. In the second embodiment, instead of the conditions 1 and 2, a control state changer 141A (which is not shown in the drawings, but denoted in this manner in the second embodiment) performs a determination when the driving state of the host vehicle M is transitioned on the basis of a condition 3 and a condition 4. The same components as those in the above-described embodiment are denoted by the same reference numerals and signs, and thus the description thereof will not be given.

The control state changer 141A transitions the driving state of the host vehicle M from the second driving state to the first driving state in a case where the host vehicle M is operating in the second driving state, and a case where the following condition 3 and condition 4 are satisfied. The condition 3 is another example of the first reference, and the condition 4 is another example of the second reference.

(Condition 3) The amount of offset of the first rearward vehicle mr1 recognized by the another vehicle recognizer 131 is equal to or greater than the first threshold th1 and less than a second threshold th2.

(Condition 4) A traveling state while maintaining a state in which the amount of offset is equal to or greater than the first threshold th1 and less than the second threshold th2 continues for the predetermined time T or more, or travel continues for a predetermined distance or more while maintaining a state in which the amount of offset is less than the second threshold th2.

The reason for performing the above-described control is because, in a case where the rearward vehicle mr is offset in great excess of the first threshold th1 even when the amount of offset is equal to or greater than the first threshold th1, the rearward vehicle stops by a store or a facility adjacent to the first lane L1 rather than just avoiding the emergency vehicle eV, or because there is the possibility of the rearward vehicle moving in the direction of a vehicle width in order to perform a course change. On the other hand, in a case where the amount of offset is equal to or greater than the first threshold th1, and does not greatly exceed the first threshold th1 (that is, less than the second threshold th2), it is possible to estimate that there is the possibility of the rearward vehicle being offset leftward with the approach of the emergency vehicle eV.

The second threshold th2 is a value larger than the first threshold th1. A position from the lane central line FP1 to a distance indicated by the second threshold th2 is a position farthest from the lane central line FP1 among positions that can be taken in a case where the first rearward vehicle mr1 is offset.

Further, the control state changer 141A makes at least the second threshold th2 variable in accordance with the presence or absence of the offset-side adjacent lane. Hereinafter, this will be described.

Figure 7:
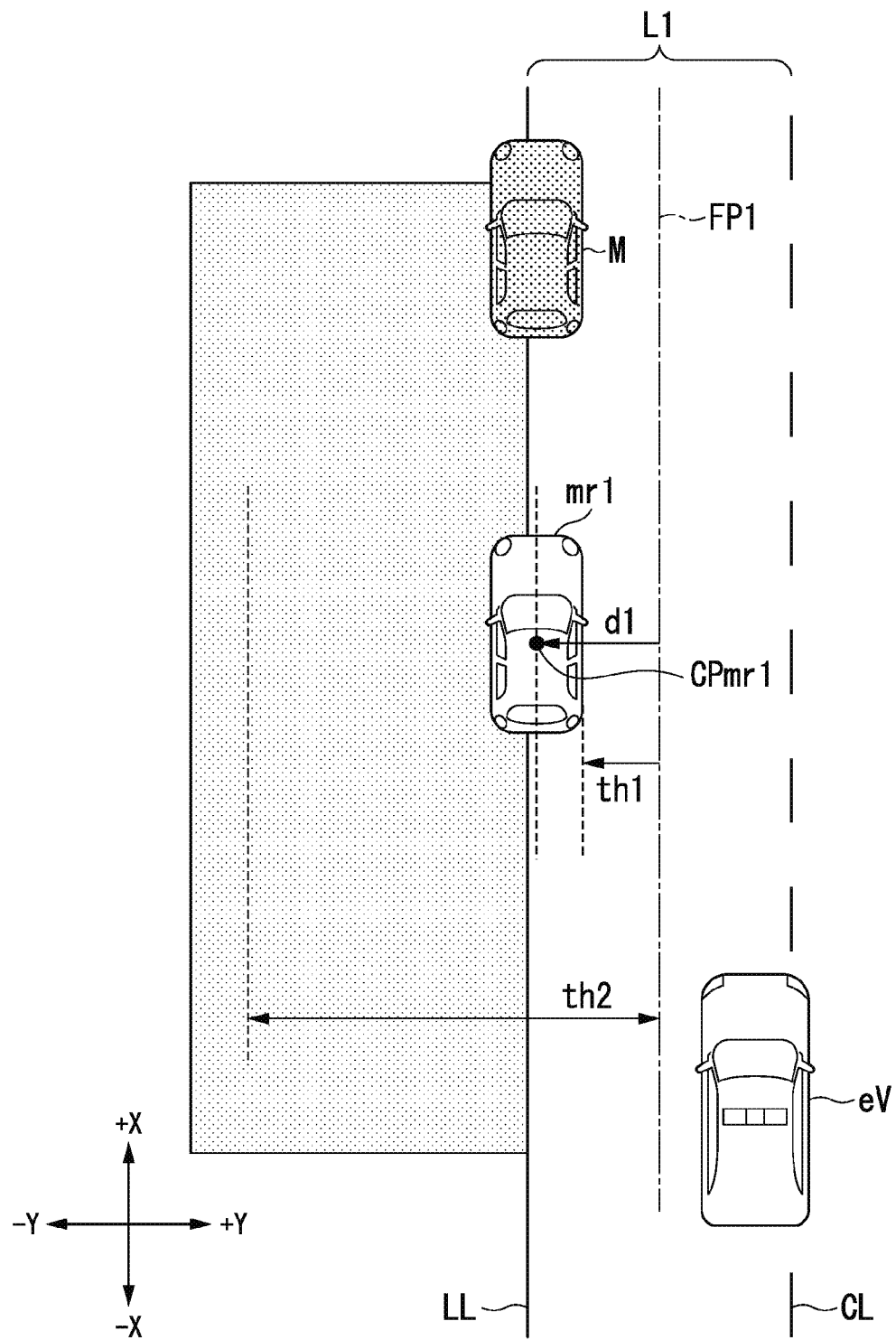
FIG. 7 is a diagram showing an example of leftward movement of a first rearward vehicle according to a second embodiment to a road shoulder.

FIG. 7 is a diagram showing an example of leftward movement of the first rearward vehicle mr1 according to the second embodiment to a road shoulder. In FIG. 7, a road shoulder is present on the left side of the first lane L1, but an adjacent lane that vehicles traveling in the first lane L1 (the host vehicle M and the first rearward vehicle mr1 shown in the drawing) can enter is not present. In FIG. 7, the amount of offset d1 of the first rearward vehicle mr1 is less than the second threshold th2, and a traveling state while maintaining a state in which it is less than the second threshold th2 continues for the predetermined time T or more. Therefore, the control state changer 141 transitions the driving state of the host vehicle M from the second driving state to the first driving state in order to satisfy the condition 3 and the condition 4.

Figure 8:
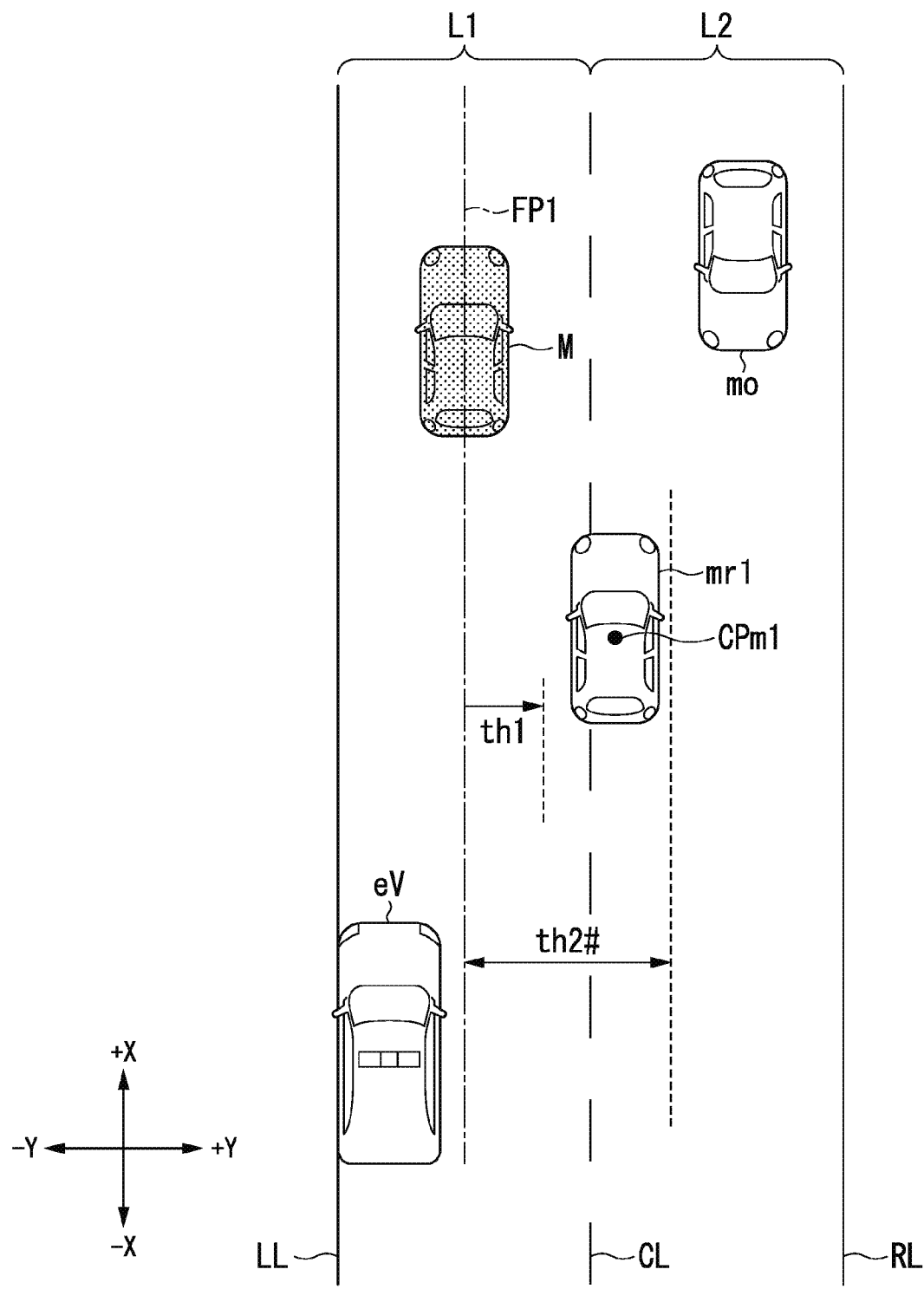
FIG. 8 is a diagram showing an example of rightward movement of the first rearward vehicle according to the second embodiment to an opposite lane.

FIG. 8 is a diagram showing an example of rightward movement of the first rearward vehicle mr1 according to the second embodiment to an opposite lane. In FIG. 8, the first rearward vehicle mr1 is offset in the direction of an adjacent lane (the second lane L2 shown in the drawing) due to the emergency vehicle eV approaching from the left rear.

In this case, the first rearward vehicle mr1 is not able to make the amount of offset larger than in a case of being offset in the direction of a road shoulder. Therefore, in the situation of FIG. 8, the control state changer 141 makes the second threshold th2 used in the determination of the (condition 3) smaller than in a case where a road shoulder is present. Specifically, the control state changer 141 uses a second threshold th2# instead of the second threshold th2. The second threshold th2# is a value smaller than the second threshold th2. A position from the lane central line FP1 to a distance indicated by the second threshold th2# is a position farthest from the lane central line FP1 among positions which can be taken in a case where the first rearward vehicle mr1 is offset, and is a position at which traveling of a vehicle that travels in an adjacent lane is not interfered with.

One object of such control is to exclude a case where a rearward vehicle performs a lane change from a control target. In a case where there is an offset-side adjacent lane, and the amount of offset is large, it is determined that a lane change is performed, in terms of probability, rather than avoidance of the emergency vehicle eV. Therefore, in a case where there is an offset-side adjacent lane, the above-mentioned tendency is realized by reducing the second threshold th2. Thereby, it is possible to prevent a driver from feeling troublesome due to the occurrence of unnecessary control.

In a case where the host vehicle M travels particularly on a branch route or an interchange junction, the control state changer 141 may control the host vehicle M on the basis of the conditions 3 and 4. Here, the rearward vehicle mr may travel at positions as shown in FIGS. 7 to 8 on a branch route or an interchange junction. Therefore, in a case where the host vehicle M travels on a branch route or an interchange junction, the control state changer 141 controls the host vehicle M on the basis of the condition 3 and 4, whereby it is possible to more accurately prevent a driver from feeling troublesome.

[Operation of Autonomous Driving Control Device 100]

Figure 9:
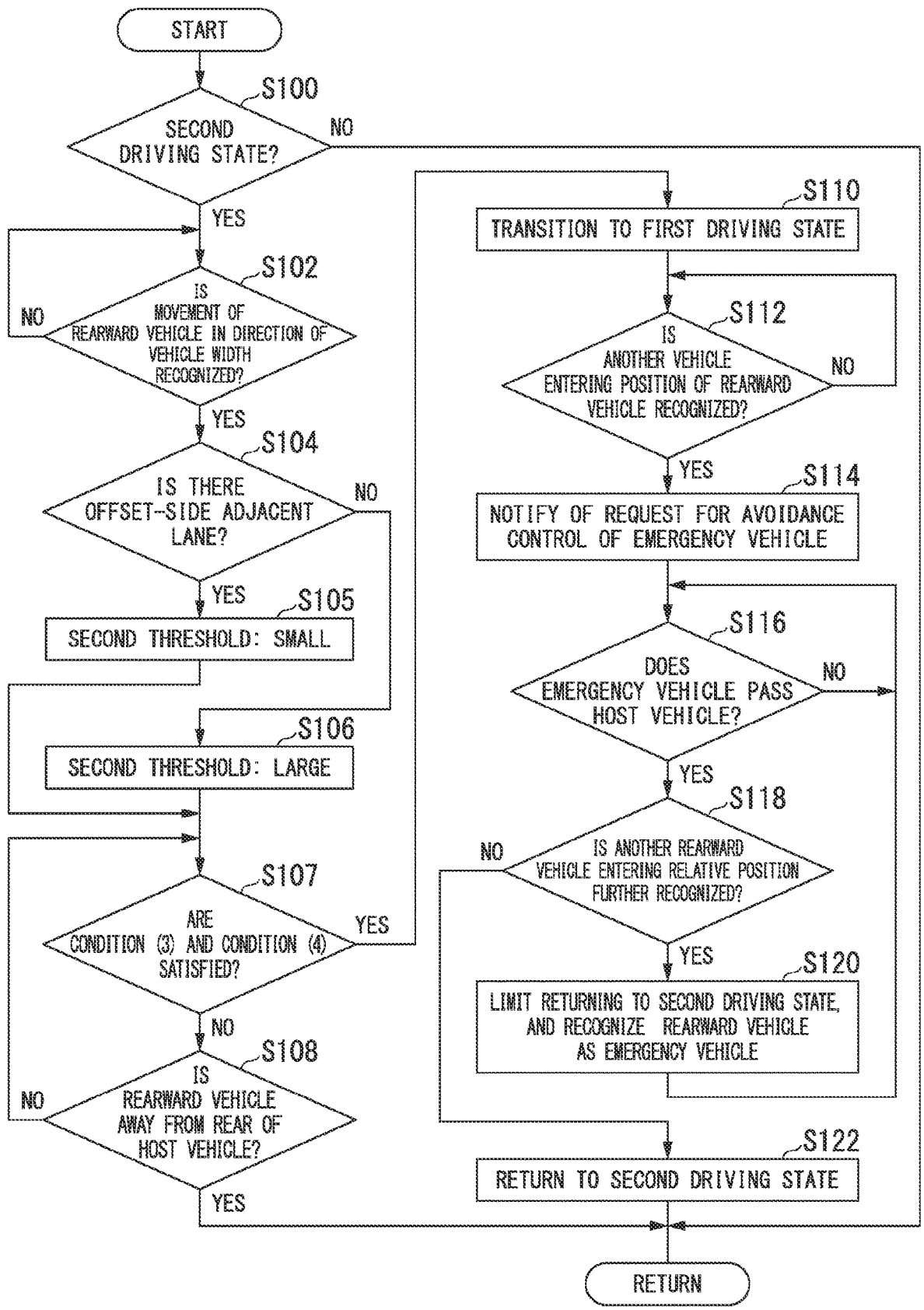
FIG. 9 is a flow chart showing an example of an operation of an autonomous driving control device according to the second embodiment.

FIG. 9 is a flow chart showing an example of an operation of an autonomous driving control device 100 according to the second embodiment. In the flow chart shown in FIG. 9, processes of steps S100 to S102 and processes of steps S108 to S122 shown in FIG. 9 are the same processes as those denoted by the same step numbers shown in FIG. 6, and thus the description thereof will not be given.

In the flow chart of the present embodiment, in a case where it is determined in step S104 that there is an offset-side adjacent lane on the basis of the recognition result of the other vehicle recognizer 131, the control state changer 141 sets the second threshold used in the determination of the (condition 3) to a small value (the above-described second threshold th2#) (step S105). In a case where it is determined in step S104 that there is no offset-side adjacent lane on the basis of the recognition result of the other vehicle recognizer 131, the control state changer 141 sets the second threshold used in the determination of the (condition 3) to a large value (the above-described second threshold th2) (step S106).

In a case where the rearward vehicle mr moves in the direction of a vehicle width, and there is no offset-side adjacent lane, the control state changer 141 determines whether the amount of offset of the rearward vehicle mr is less than the second threshold th2 or second threshold th2# (condition 3), and a traveling state in which the (condition 3) is satisfied (that is, the continuation aspect of the (condition 3)) continues for the predetermined time T or more (condition 4) (step S107).

Conclusion of Second Embodiment

As described above, in the autonomous driving control device 100 of the present embodiment, the first reference includes that the amount of offset of the rearward vehicle mr in the direction of a vehicle width is less than a second threshold (in this example, the second threshold th2), a difference between the first threshold th1 and the second threshold th2 is increased in a case where a lane that enables the rearward vehicle mr to enter a side on which the rearward vehicle mr is offset in the direction of a vehicle width is not recognized by the other vehicle recognizer 131, and it is recognized that a road shoulder is present on the side on which the rearward vehicle mr is offset in the direction of a vehicle width, and the difference between the first threshold th1 and the second threshold th2 is reduced in a case where a lane that enables the rearward vehicle mr to enter is not recognized by the other vehicle recognizer 131, and it is recognized that a road shoulder is not present on the side on which the rearward vehicle mr is offset in the direction of a vehicle width, whereby it is possible to detect an operation of the rearward vehicle mr more accurately, and to prepare for passage of an emergency vehicle more rapidly.

[Another Driving State of Host Vehicle M]

Figure 10:
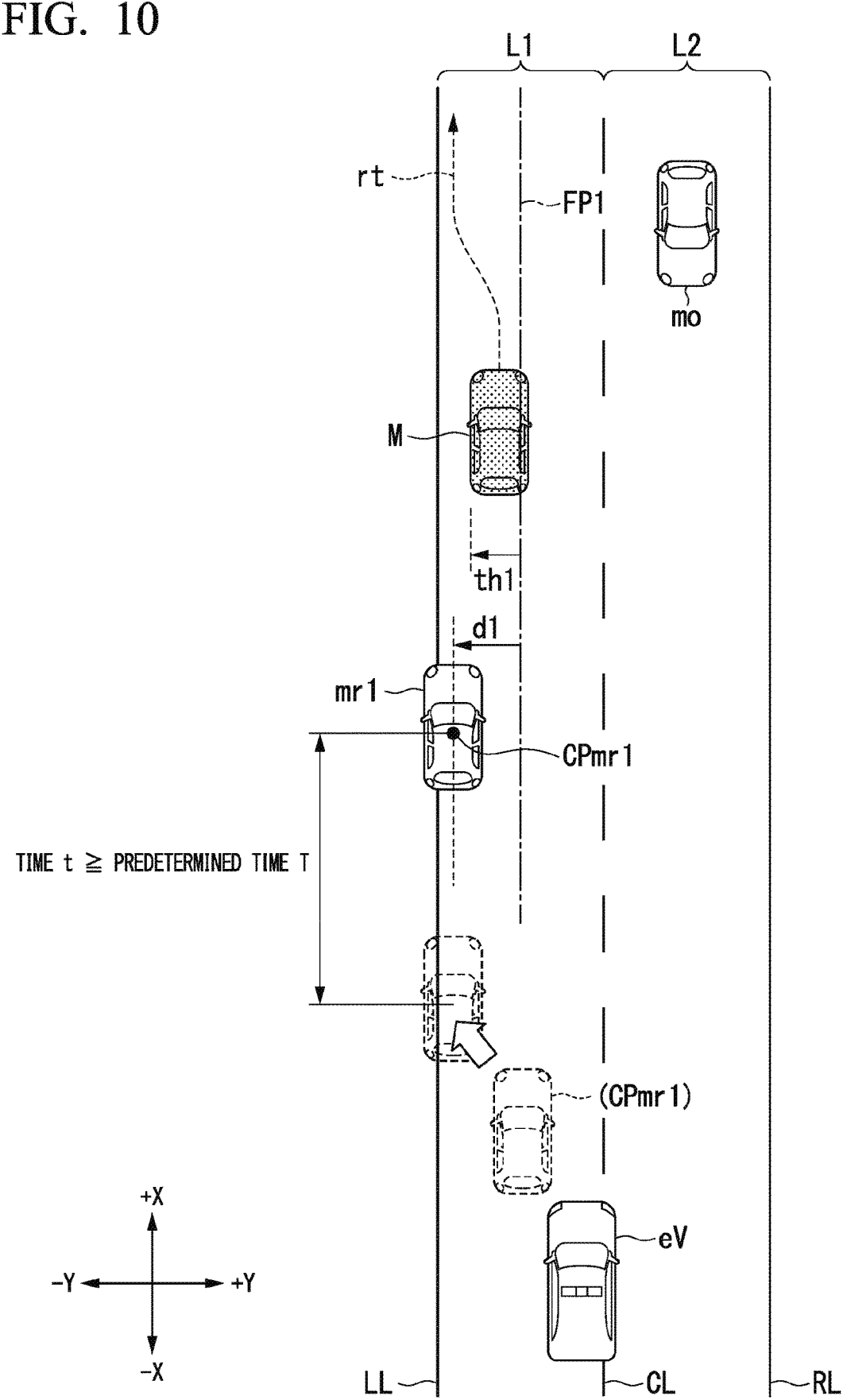
FIG. 10 is a diagram showing an example of a traveling route of a host vehicle in an emergency vehicle avoidance driving state.

In the above, a case where the control state changer 141 causes the host vehicle M to operate in any of the first driving state and the second driving state has been described, but there is no limitation thereto. In a case where it is determined that the rearward vehicle mr is in a state in which the (condition 1) and the (condition 2) (or the (condition 3) and the (condition 4)) are satisfied, the control state changer 141 may cause the host vehicle M to operate in an emergency vehicle avoidance driving state. FIG. 10 is a diagram showing an example of a traveling route of the host vehicle M in an emergency vehicle avoidance driving state. The emergency vehicle avoidance driving state is, for example, a state in which the behavior plan generator 140 generates a route which is offset in the direction of avoidance of the emergency vehicle eV (a route rt shown in the drawing) with the approach of the emergency vehicle eV, and the second controller 160 controls the host vehicle M using autonomous driving so as to travel on the route generated by the behavior plan generator 140. Thereby, the autonomous driving control device 100 causes the host vehicle M to offset travel using autonomous driving, and thus it is possible to prepare for passage of an emergency vehicle more rapidly.

[Driving State Transition Process Based on a Plurality of Rearward Vehicles mr]

In the above, a case where the control state changer 141 estimates the approach of the emergency vehicle eV on the basis of a certain rearward vehicle mr, and transitions the driving state of the host vehicle M from the second driving state to the first driving state has been described, but there is no limitation thereto. The control state changer 141 may estimate the approach of the emergency vehicle eV on the basis of a plurality of rearward vehicles mr, and transition the driving state of the host vehicle M from the second driving state to the first driving state. The control state changer 141 transitions the driving state of the host vehicle M to the first driving state in a case of satisfying a condition including that, among the rearward vehicles mr that travel rearward of the host vehicle M, a first rearward vehicle mr1 that travels rearward of the host vehicle M in a host lane and a second rearward vehicle mr2 that travels rearward of the host vehicle M in a lane adjacent to the host lane move in directions in which the rearward vehicles go away from each other in the direction of a vehicle width.

Figure 11:
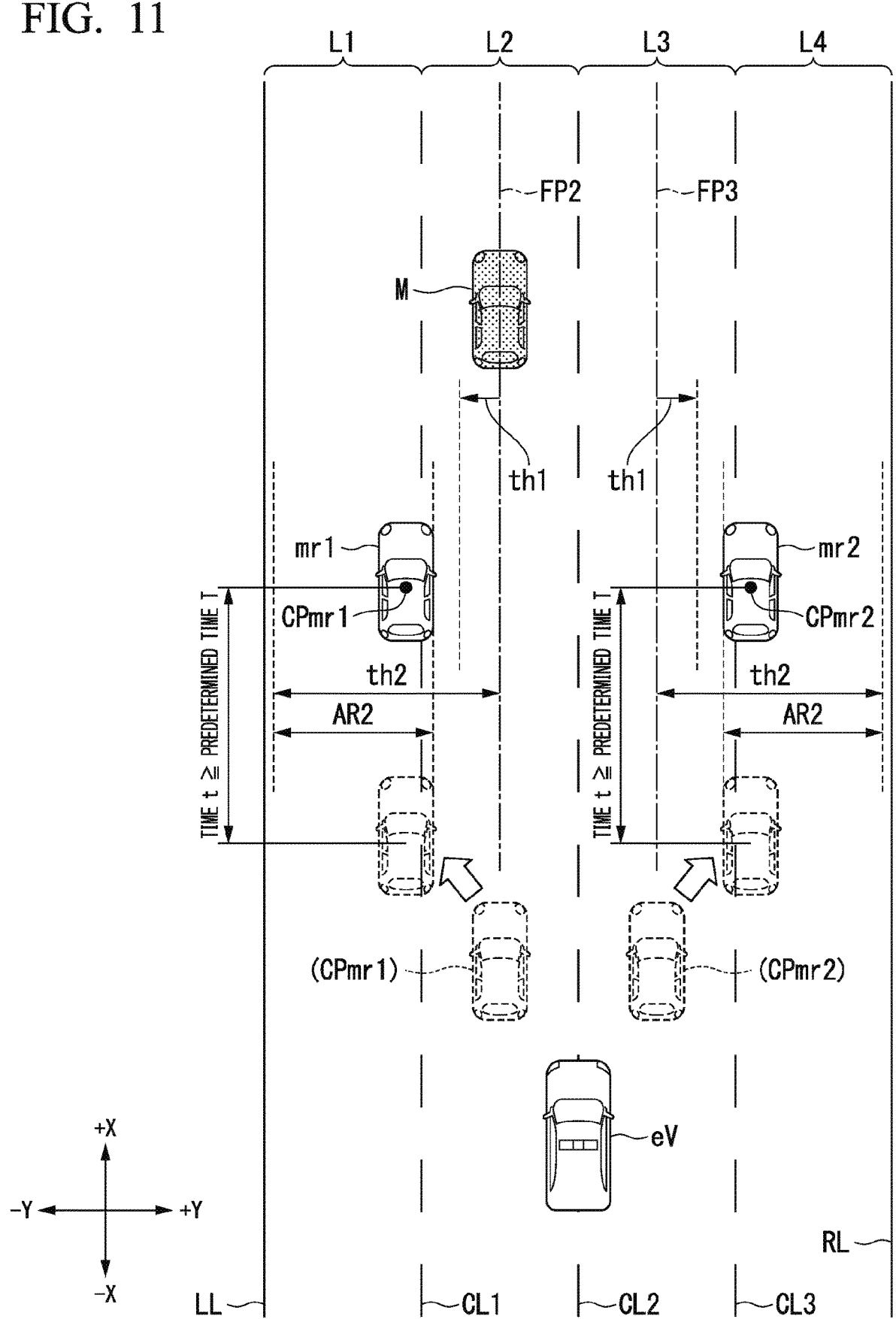
FIG. 11 is a diagram schematically showing another example of a process of a control state changer.

FIG. 11 is a diagram schematically showing another example of a process of the control state changer 141. In FIG. 11, the host vehicle M is operating in the second driving state, the host vehicle M and the first rearward vehicle mr1 are traveling in the second lane L2, and from a situation in which the second rearward vehicle mr2 is traveling in a third lane L3, the emergency vehicle eV is approaching the host vehicle M while traveling between the second lane L2 and the third lane L3. The first rearward vehicle mr1 is offset leftward to thereby clear the traveling route of the emergency vehicle eV, and the second rearward vehicle mr2 is offset rightward to thereby clear the traveling route of the emergency vehicle eV. Accordingly, the autonomous driving control device 100 determines that the above-described condition of "move in directions in which vehicles go away from each other in the direction of a vehicle width" is satisfied, and transitions the driving state of the host vehicle M to the first driving state.

By narrowing down the condition more strictly in this manner, it is possible to prevent unnecessary control from occurring, and to prevent a driver from feeling troublesome. In this case, as conditions for transition to a state in which the approach of the emergency vehicle eV is prepared for, conditions as described in the conditions 1 to 4 may be imposed on each of a plurality of rearward vehicles.

[Driving State Transition Process in Case where there is No Entrance Enabling Adjacent Lane]

In the above, a case where, when there is no offset-side adjacent lane, the control state changer 141 performs a process of transitioning the driving state of the host vehicle M to the first driving state has been described, but there is no limitation thereto. For example, in a case where the (condition 1) and the (condition 2) (or the (condition 3) and the (condition 4)) are satisfied even when there is adjacent lane that the rearward vehicle mr can enter, the control state changer 141 may transition the driving state of the host vehicle M from the second driving state to the first driving state. In this case, the second threshold th2# is used in the determination of the (condition 3) in any situation.

[Hardware Configuration]

Figure 12:
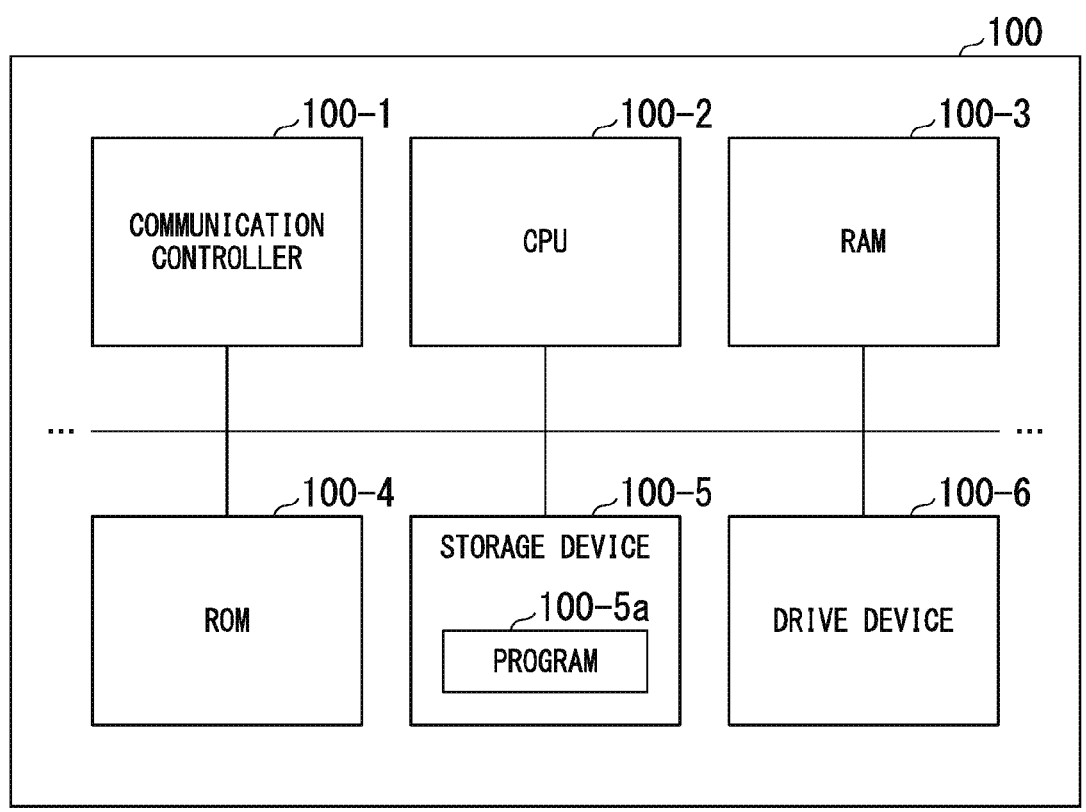
FIG. 12 is a diagram showing an example of a hardware configuration of the autonomous driving control device.

FIG. 12 is a diagram showing an example of a hardware configuration of the autonomous driving control device 100. As shown in the drawing, the autonomous driving control device 100 is configured such that a communication controller 100-1, a CPU 100-2, a random access memory (RAM) 100-3 used as a working memory, a read only memory (ROM) 100-4 that stores a boot program or the like, a flash memory, a storage device 100-5 such as a hard disk drive (HDD), a drive device 100-6, and the like are connected to each other through an internal bus or a dedicated communication line. The communication controller 100-1 performs communication with components other than the autonomous driving control device 100. The storage device 100-5 stores a program 100-5a executed by the CPU 100-2. This program is developed into the RAM 100-3 by a direct memory access (DMA) controller (not shown) or the like, and is executed by the CPU 100-2. Thereby, some or all of the recognizer 130, the behavior plan generator 140, and the second controller 160 are realized.

The above-described embodiment can be represented as follows.

A vehicle control device including:
a storage device having a program stored therein; and
a hardware processor,
wherein the hardware processor executes the program stored in the storage, to thereby
recognize a surrounding situation of a host vehicle,
control acceleration or deceleration and steering of the host vehicle on the basis of a recognition result,
control the host vehicle in at least any of a first driving state and a second driving state in which a rate of automation is higher or tasks required of an occupant are fewer than in the first driving state, and
transition a driving state of the host vehicle to the first driving state in a case where the host vehicle is operating in the second driving state, and movement of a rearward vehicle of the host vehicle in a direction of a vehicle width is recognized by the recognizer.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising:
a recognizer that is configured to recognize a surrounding situation of a host vehicle;
a driving controller that is configured to control acceleration or deceleration and steering of the host vehicle on the basis of a recognition result of the recognizer;
a notifier that is configured to notify of information; and
a notification controller that is configured to cause the notifier to notify a driver of the host vehicle of a request for avoidance control for avoiding a rearward vehicle in a case where another rearward vehicle entering a relative position before the rearward vehicle moves in a direction of a vehicle width is recognized by the recognizer,
wherein the driving controller
is configured to estimate whether or not an emergency vehicle is approaching based on the movement of the rearward vehicle in the direction of a vehicle width,
is configured to cause the host vehicle to operate in at least any of a first driving state and a second driving state in which the second driving state is configured to have a rate of automation higher or tasks required of an occupant fewer than in the first driving state, and
is configured to transition a driving state of the host vehicle to the first driving state on the basis of movement of a rearward vehicle that travels rearward of the host vehicle recognized by the recognizer in the direction of a vehicle width in a case where the host vehicle is operating in the second driving state, wherein the driving controller is configured to determine that the movement of the rearward vehicle in the direction of a vehicle width satisfies a reference and the emergency vehicle is approaching in a case where an amount of offset of the rearward vehicle recognized by the recognizer in the direction of a vehicle width satisfies a first reference, and a continuation aspect of satisfying the first reference satisfies a second reference,
the first reference includes that the amount of offset of the rearward vehicle in the direction of a vehicle width is equal to or greater than a first threshold,
the continuation aspect satisfying the second reference includes that a state in which the rearward vehicle satisfies the first reference continues for a predetermined time or more or that a traveling distance that the rearward vehicle has traveled in a state in which the first reference is satisfied is equal to or greater than a predetermined distance,
wherein the recognizer is further configured to recognize the presence or absence of a lane that enables the rearward vehicle to enter a side on which the rearward vehicle is offset in the direction of a vehicle width,
wherein the driving controller is configured to maintain the driving state of the host vehicle in the second driving state in a case where the host vehicle has been operating in the second driving state, the movement of the rearward vehicle recognized by the recognizer in the direction of a vehicle width satisfies a reference, and it is recognized that the entrance enabling lane is present,
the driving controller is configured to transition the driving state of the host vehicle to the first driving state in a case where the host vehicle has been operating in the second driving state, the movement of the rearward vehicle recognized by the recognizer in the direction of a vehicle width satisfies a reference, and it is not recognized that the entrance enabling lane is present,
wherein the adjacent lane is a lane in which a vehicle in the same traveling direction as the rearward vehicle travels, and
wherein the notification controller regards the another rearward vehicle entering the relative position as an emergency vehicle.

2. The vehicle control device according to claim 1, wherein the rearward vehicle is a vehicle that travels rearward of the host vehicle in a host lane that is a lane in which the host vehicle travels or a lane that is adjacent to the host lane.

3. The vehicle control device according to claim 1, wherein the driving controller is configured to determine that the movement of the rearward vehicle in the direction of a vehicle width satisfies a reference in a case where an amount of offset of the rearward vehicle recognized by the recognizer in the direction of a vehicle width satisfies a first reference, and a continuation aspect of satisfying the first reference satisfies a second reference.

4. The vehicle control device according to claim 3, wherein the first reference includes that the amount of offset of the rearward vehicle in the direction of a vehicle width is equal to or greater than a first threshold.

5. The vehicle control device according to claim 3, wherein the first reference includes that the amount of offset of the rearward vehicle in the direction of a vehicle width is equal to or greater than a first threshold and less than a second threshold.

6. The vehicle control device according to claim 5, wherein the driving controller is configured to reduce a magnitude of the difference between the first threshold and the second threshold in a case where the recognizer does not recognize a rearward driving lane, other than the host lane, and it is further recognized that a road shoulder is not present on the side on which the rearward vehicle is offset in the direction of a vehicle width, wherein the rearward driving lane enables the rearward vehicle to enter a side on which the rearward vehicle is offset in the direction of the vehicle width.

7. The vehicle control device according to claim 3, wherein the continuation aspect satisfying the second reference includes that a state in which the rearward vehicle satisfies the first reference continues for a predetermined time or more.

8. The vehicle control device according to claim 3, wherein the continuation aspect satisfying the second reference includes that a traveling distance that the rearward vehicle has traveled in a state in which the first reference is satisfied is equal to or greater than a predetermined distance.

9. The vehicle control device according to claim 3, wherein the amount of offset is measured from a lane center or a center of the host vehicle.

10. The vehicle control device according to claim 1, wherein the driving controller
is configured to return the driving state of the host vehicle to the second driving state in a case where a predetermined condition is satisfied after transition to the first driving state, and
is configured to limit returning of the driving state of the host vehicle to the second driving state in a case where another rearward vehicle entering a relative position before the rearward vehicle moves in the direction of a vehicle width is recognized by the recognizer.

11. The vehicle control device according to claim 1, wherein, in a case where the host vehicle is operating in the second driving state, the driving controller is configured to transition the driving state of the host vehicle to the first driving state in a case of satisfying a condition including that a first rearward vehicle that is the rearward vehicle traveling in a host lane that is a lane in which the host vehicle travels and a second rearward vehicle that is the rearward vehicle traveling rearward of the host vehicle in a lane adjacent to the host lane move in directions in which the rearward vehicles go away from each other in the direction of a vehicle width.

12. A vehicle control device comprising:
a recognizer that is configured to recognize a surrounding situation of a host vehicle;
a driving controller that is configured to control acceleration or deceleration and steering of the host vehicle on the basis of a recognition result of the recognizer;
a notifier that is configured to notify of information; and
a notification controller that is configured to cause the notifier to notify a driver of the host vehicle of a request for avoidance control for avoiding a rearward vehicle in a case where another rearward vehicle entering a relative position before the rearward vehicle moves in the direction of a vehicle width is recognized by the recognizer,
wherein the driving controller
is configured to estimate whether or not an emergency vehicle is approaching based on the movement of the rearward vehicle in the direction of a vehicle width,
is configured to cause the host vehicle to operate in at least any of a plurality of driving states including an emergency vehicle avoidance driving state, and
is configured to transition a driving state of the host vehicle to the emergency vehicle avoidance driving state on the basis of movement of a rearward vehicle that travels rearward of the host vehicle recognized by the recognizer in a direction of a vehicle width in a case where the host vehicle is not operating in the emergency vehicle avoidance driving state,
wherein the driving controller is configured to determine that the movement of the rearward vehicle in the direction of a vehicle width satisfies a reference and the emergency vehicle is approaching in a case where an amount of offset of the rearward vehicle recognized by the recognizer in the direction of a vehicle width satisfies a first reference, and a continuation aspect of satisfying the first reference satisfies a second reference,
the first reference includes that the amount of offset of the rearward vehicle in the direction of a vehicle width is equal to or greater than a first threshold,
the continuation aspect satisfying the second reference includes that a state in which the rearward vehicle satisfies the first reference continues for a predetermined time or more or that a traveling distance that the rearward vehicle has traveled in a state in which the first reference is satisfied is equal to or greater than a predetermined distance,
wherein the recognizer is further configured to recognize the presence or absence of a lane that enables the rearward vehicle to enter a side on which the rearward vehicle is offset in the direction of a vehicle width,
wherein the driving controller is configured to maintain the driving state of the host vehicle in the second driving state in a case where the host vehicle has been operating in the second driving state, the movement of the rearward vehicle recognized by the recognizer in the direction of a vehicle width satisfies a reference, and it is recognized that the entrance enabling lane is present,
the driving controller is configured to transition the driving state of the host vehicle to the first driving state in a case where the host vehicle has been operating in the second driving state, the movement of the rearward vehicle recognized by the recognizer in the direction of a vehicle width satisfies a reference, and it is not recognized that the entrance enabling lane is present,
wherein the adjacent lane is a lane in which a vehicle in the same traveling direction as the rearward vehicle travels, and
wherein the notification controller regards the another rearward vehicle entering the relative position as an emergency vehicle.

13. A vehicle control method comprising causing a computer to:
recognize a surrounding situation of a host vehicle;
control acceleration or deceleration and steering of the host vehicle on the basis of a recognition result;
notify a driver of the host vehicle of a request for avoidance control for avoiding a rearward vehicle in a case where another rearward vehicle entering a relative position before the rearward vehicle moves in the direction of a vehicle width is recognized;
estimate whether or not an emergency vehicle is approaching based on the movement of the rearward vehicle in the direction of a vehicle width;

control the host vehicle in at least any of a first driving state and a second driving state in which a rate of automation is higher or tasks required of an occupant are fewer than in the first driving state;
transition a driving state of the host vehicle to the first driving state on the basis of movement of a recognized rearward vehicle that travels rearward of the host vehicle in a direction of a vehicle width in a case where the host vehicle is operating in the second driving state; and
determine that the movement of the rearward vehicle in the direction of a vehicle width satisfies a reference and the emergency vehicle is approaching in a case where an amount of offset of the rearward vehicle recognized by the recognizer in the direction of a vehicle width satisfies a first reference, and a continuation aspect of satisfying the first reference satisfies a second reference,
wherein the first reference includes that the amount of offset of the rearward vehicle in the direction of a vehicle width is equal to or greater than a first threshold,
the continuation aspect satisfying the second reference includes that a state in which the rearward vehicle satisfies the first reference continues for a predetermined time or more or that a traveling distance that the rearward vehicle has traveled in a state in which the first reference is satisfied is equal to or greater than a predetermined distance,
wherein the vehicle control method further causes the computer to:
recognize the presence or absence of a lane that enables the rearward vehicle to enter a side on which the rearward vehicle is offset in the direction of a vehicle width,
maintain the driving state of the host vehicle in the second driving state in a case where the host vehicle has been operating in the second driving state, the movement of the rearward vehicle recognized by the recognizer in the direction of a vehicle width satisfies a reference, and it is recognized that the entrance enabling lane is present,
transition the driving state of the host vehicle to the first driving state in a case where the host vehicle has been operating in the second driving state, the movement of the rearward vehicle recognized by the recognizer in the direction of a vehicle width satisfies a reference, and it is not recognized that the entrance enabling lane is present,
wherein the adjacent lane is a lane in which a vehicle in the same traveling direction as the rearward vehicle travels, and
wherein the vehicle control method further causes the computer to regard the another rearward vehicle entering the relative position as an emergency vehicle.

14. A non-transitory machine-readable medium having a program stored therein, the program causing a computer to:
recognize a surrounding situation of a host vehicle;
control acceleration or deceleration and steering of the host vehicle on the basis of a recognition result;
notify a driver of the host vehicle of a request for avoidance control for avoiding a rearward vehicle in a case where another rearward vehicle entering a relative position before the rearward vehicle moves in the direction of a vehicle width is recognized;
estimate whether or not an emergency vehicle is approaching based on the movement of the rearward vehicle in the direction of a vehicle width;
cause the host vehicle to operate in at least any of a first driving state and a second driving state in which a rate of automation is higher or tasks required of an occupant are fewer than in the first driving state;
transition a driving state of the host vehicle to the first driving state on the basis of movement of a recognized rearward vehicle that travels rearward of the host vehicle in a direction of a vehicle width in a case where the host vehicle is operating in the second driving state; and
determine that the movement of the rearward vehicle in the direction of a vehicle width satisfies a reference and the emergency vehicle is approaching in a case where an amount of offset of the rearward vehicle recognized by the recognizer in the direction of a vehicle width satisfies a first reference, and a continuation aspect of satisfying the first reference satisfies a second reference,
wherein the first reference includes that the amount of offset of the rearward vehicle in the direction of a vehicle width is equal to or greater than a first threshold,
the continuation aspect satisfying the second reference includes that a state in which the rearward vehicle satisfies the first reference continues for a predetermined time or more or that a traveling distance that the rearward vehicle has traveled in a state in which the first reference is satisfied is equal to or greater than a predetermined distance,
wherein the vehicle control method further causes the computer to:
recognize the presence or absence of a lane that enables the rearward vehicle to enter a side on which the rearward vehicle is offset in the direction of a vehicle width,
maintain the driving state of the host vehicle in the second driving state in a case where the host vehicle has been operating in the second driving state, the movement of the rearward vehicle recognized by the recognizer in the direction of a vehicle width satisfies a reference, and it is recognized that the entrance enabling lane is present,
transition the driving state of the host vehicle to the first driving state in a case where the host vehicle has been operating in the second driving state, the movement of the rearward vehicle recognized by the recognizer in the direction of a vehicle width satisfies a reference, and it is not recognized that the entrance enabling lane is present,
wherein the adjacent lane is a lane in which a vehicle in the same traveling direction as the rearward vehicle travels, and
wherein the vehicle control method further causes the computer to regard the another rearward vehicle entering the relative position as an emergency vehicle.

15. The vehicle control device according to claim 1, wherein the driving controller does not make a determination whether or not the rearward vehicle moves in the direction of the vehicle in a driving condition where a steering wheel grasping is required and the driving controller makes the determination in a driving condition where the steering wheel grasping is not required.

16. The vehicle control device according to claim 1, wherein the driving controller detects the entrance enabling lane based on a detection result of a radar device and a light detection and ranging (LIDAR).

* * * * *